(12) United States Patent
Yang et al.

(10) Patent No.: US 10,440,447 B2
(45) Date of Patent: Oct. 8, 2019

(54) BROADCAST SIGNAL TRANSMISSION/RECEPTION DEVICE AND METHOD

(71) Applicant: LG ELECTRONICS INC., Seoul (KR)

(72) Inventors: Seungryul Yang, Seoul (KR); Minsung Kwak, Seoul (KR); Woosuk Ko, Seoul (KR); Sungryong Hong, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/765,761

(22) PCT Filed: Oct. 6, 2016

(86) PCT No.: PCT/KR2016/011193
§ 371 (c)(1),
(2) Date: Aug. 28, 2018

(87) PCT Pub. No.: WO2017/061792
PCT Pub. Date: Apr. 13, 2017

(65) Prior Publication Data
US 2019/0007753 A1 Jan. 3, 2019

Related U.S. Application Data

(60) Provisional application No. 62/238,684, filed on Oct. 7, 2015, provisional application No. 62/253,090, filed (Continued)

(51) Int. Cl.
*H04N 21/8358* (2011.01)
*H04N 21/2362* (2011.01)
(Continued)

(52) U.S. Cl.
CPC ..... *H04N 21/8358* (2013.01); *H04L 65/4076* (2013.01); *H04N 21/2362* (2013.01);
(Continued)

(58) Field of Classification Search
None
See application file for complete search history.

(56) References Cited

U.S. PATENT DOCUMENTS 10,171,849 B1 *  1/2019  Hwang ............ H04N 21/26258
10,212,461 B2 *  2/2019  Kwak ................. H04N 21/236
(Continued)

FOREIGN PATENT DOCUMENTS

| KR | 1020090131663 A | 12/2009 |
| KR | 20130009670 A | 1/2013 |
| KR | 20130140113 A | 12/2013 |

*Primary Examiner* — Alexander Q Huerta
(74) *Attorney, Agent, or Firm* — Dentons US LLP

(57) ABSTRACT

A broadcast signal transmission method is disclosed. The broadcast signal transmission method according to one embodiment of the present invention comprises the steps of: processing video data and audio data; encoding a broadcast service component, including the video data and audio data, and service layer signaling (SLS) information on the broadcast service component on the basis of a delivery protocol; subjecting the broadcast service component, the SLS information, and service list table (SLT) information to IP packetization; and subjecting the broadcast service component, the SLS information, and the SLT information to physical layer processing.

24 Claims, 22 Drawing Sheets

Related U.S. Application Data on Nov. 9, 2015, provisional application No. 62/257,230, filed on Nov. 19, 2015.

(51) Int. Cl.

| | | |
|---|---|---|
| *H04N 21/2381* | (2011.01) |
| *H04N 21/2389* | (2011.01) |
| *H04N 21/643* | (2011.01) |
| *H04N 21/443* | (2011.01) |
| *H04N 21/61* | (2011.01) |
| *H04L 29/06* | (2006.01) |

(52) U.S. Cl.
CPC ..... *H04N 21/2381* (2013.01); *H04N 21/2389* (2013.01); *H04N 21/4432* (2013.01); *H04N 21/61* (2013.01); *H04N 21/643* (2013.01)

(56) References Cited

U.S. PATENT DOCUMENTS

| | | | |
|---|---|---|---|
| 10,237,591 B2* | 3/2019 | Hwang | H04N 21/236 |
| 2009/0094356 A1 | 4/2009 | Vare | |
| 2012/0033035 A1* | 2/2012 | Lee | H04N 13/194 |
| | | | 348/42 |
| 2013/0298177 A1* | 11/2013 | Rhyu | H04N 21/643 |
| | | | 725/110 |
| 2016/0234532 A1* | 8/2016 | Lee | H04N 21/2381 |
| 2016/0255394 A1* | 9/2016 | Yang | H04N 21/434 |
| | | | 725/131 |
| 2017/0373776 A1* | 12/2017 | Lee | H04H 20/72 |
| 2018/0048408 A1* | 2/2018 | Deshpande | H04H 60/72 |
| 2018/0063561 A1* | 3/2018 | Kwon | H04N 21/2343 |
| 2018/0146022 A1* | 5/2018 | Kwon | H04N 21/2343 |
| 2018/0176618 A1* | 6/2018 | Yang | H04N 21/236 |

* cited by examiner

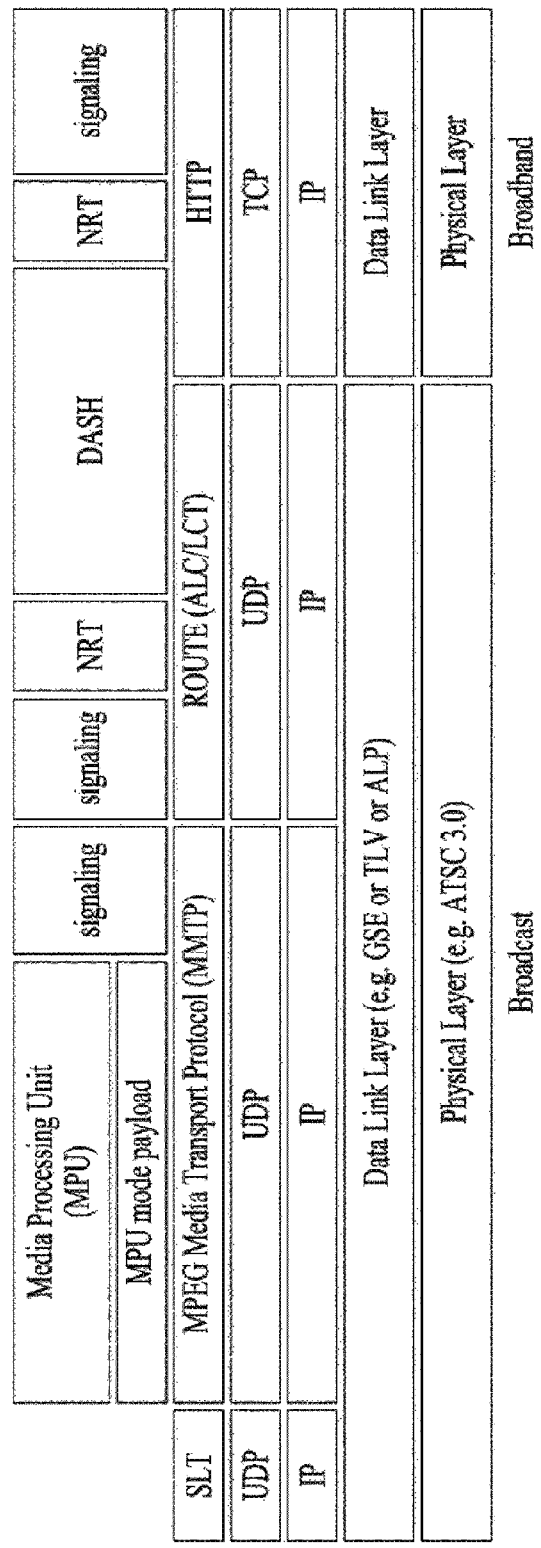
[Figure 1]

[Figure 2]
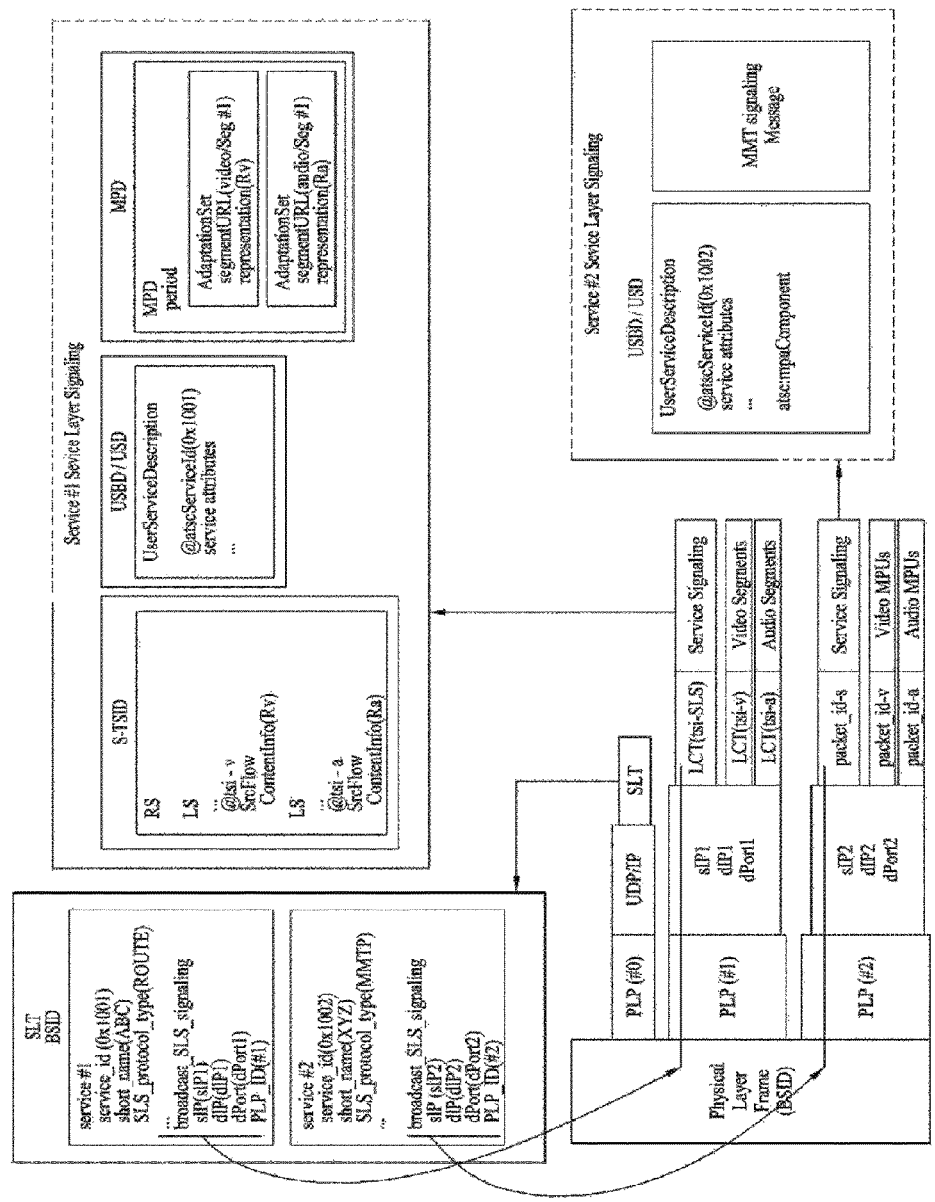

【Figure 3】

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | |

13010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1..999 |
|     @minorChannelNo | 0..1 | 1..999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte |

| Element or Attribute Name | | | | | Use | Data Type |
|---|---|---|---|---|---|---|
| bundleDescription | | | | | | |
| | userServiceDescription | | | | | |
| | | @globalServiceID | | | 1 | anyURL |
| | | @serviceID | | | 1 | unsignedShort |
| | | @serviceStatus | | | 0..1 | boolean |
| | | @fullMPDUri | | | 1 | anyURL |
| | | @sTSIDUri | | | 1 | anyURL |
| | | name | | | 0..N | string |
| | | | @lang | | 1 | language |
| | | serviceLanguage | | | 0..N | language |
| | | capabilityCode | | | 0..1 | string |
| | | deliveryMethod | | | 1..N | |
| | | | broadcastAppService | | 1..N | |
| | | | | basePattern | 1..N | string |
| | | | unicastAppService | | 0..N | |
| | | | | basePattern | 1..N | string |

— t4010

| Element or Attribute Name | | Use | Data Type |
|---|---|---|---|
| S-TSID | | | |
| | @serviceID | 1 | unsignedShort |
| | RS | 1..N | |
| | | @bsid | 0..1 | unsignedShort |
| | | @slpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | ScrFlow | 0..1 | scrFlowType |
| | | RepairFlow | 0..1 | rprFlowType | t4020

【Figure 5】

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

[Figure 6]
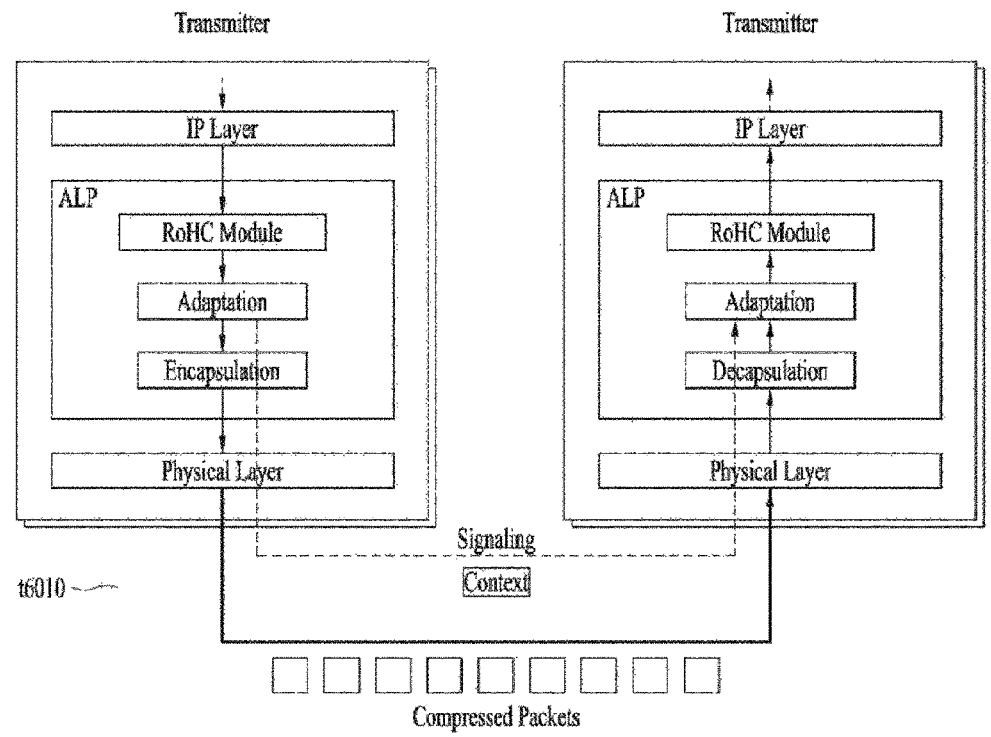
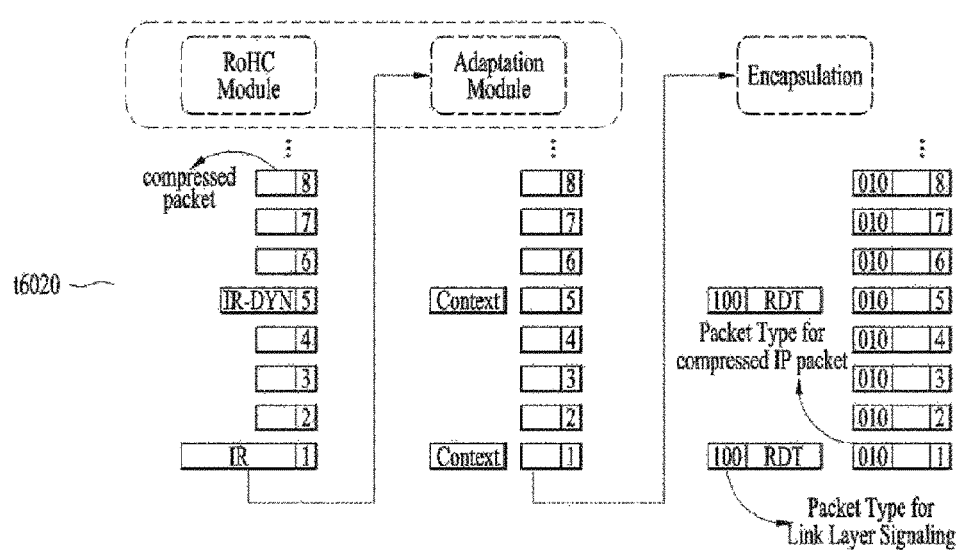

[Figure 7]

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == "1") { | | |
|             context_id | 8 | uimsbf |
|         } | | |
|     } | | |
| } | | |

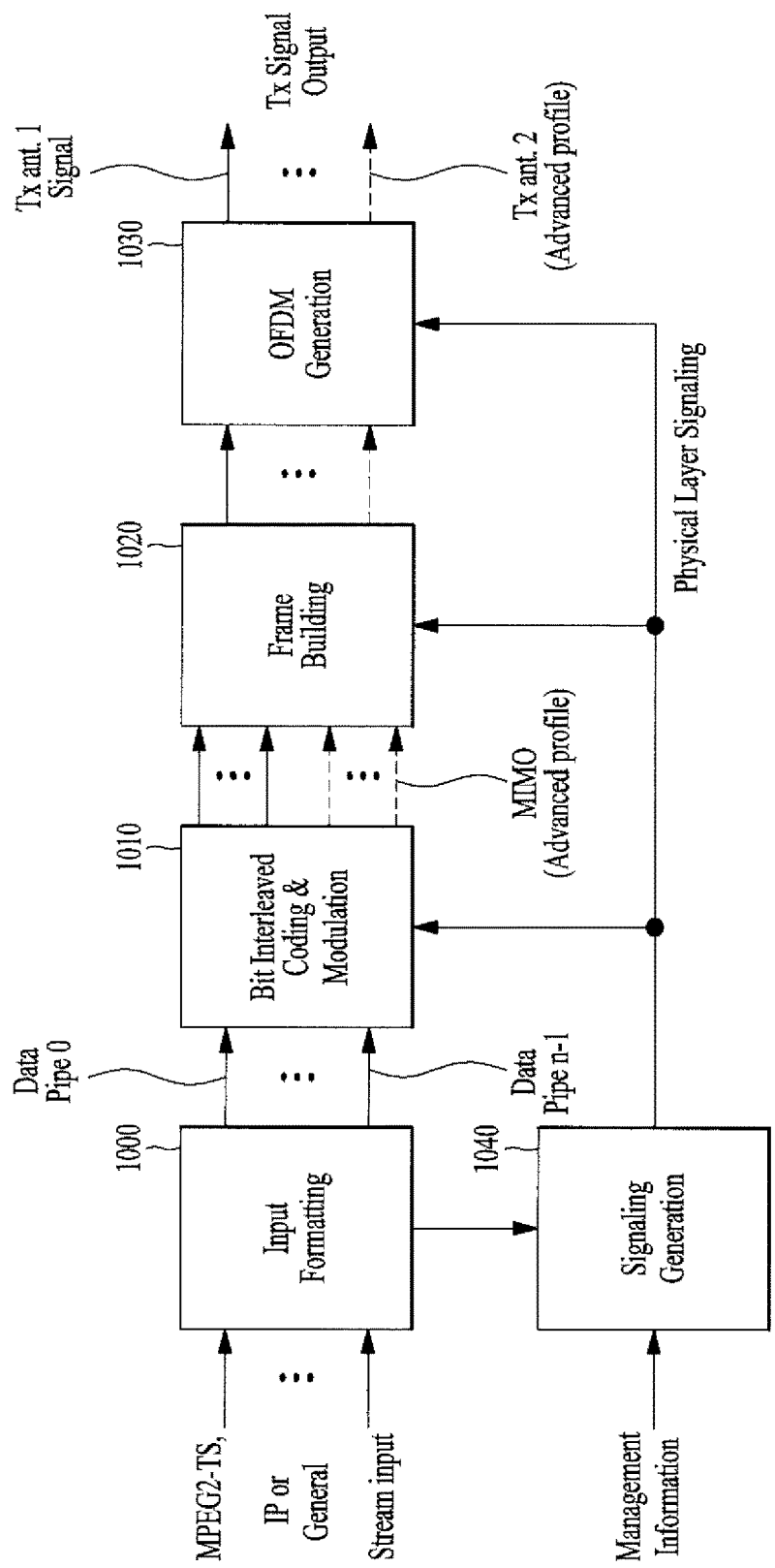
[Figure 8]

[Figure 9]

[Figure 10]
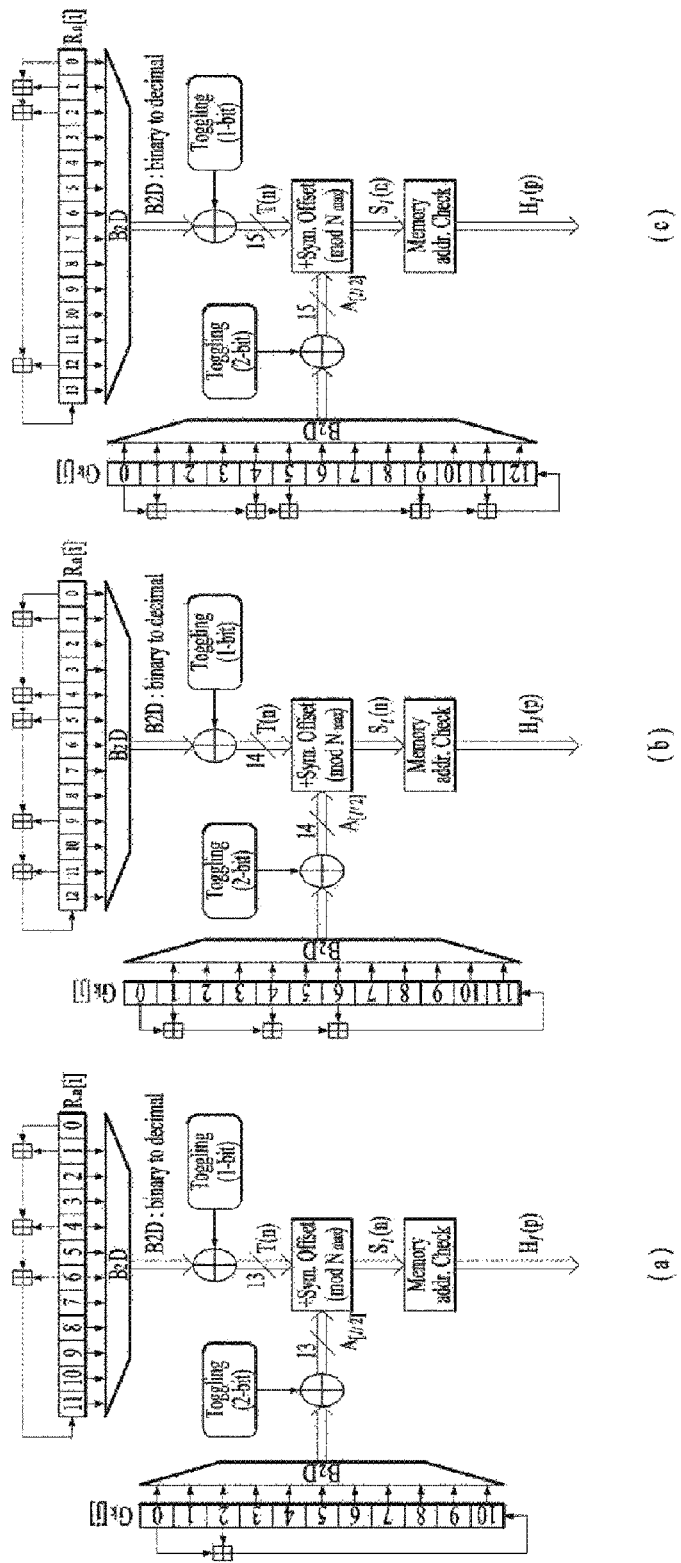

[Figure 11a]

| Element Name | | | | | | Cardinality | DataType |
|---|---|---|---|---|---|---|---|
| ApplicationList | | | | | | 1 | mhp:ApplicationList |
| | Application | | | | | 0...N | mhp:Application |
| | | appName | | | | 1...N | ipi:MultilingualType (based string) |
| | | | @Language | | | R | dvb:ISO639-2 (patterned string) |
| | | applicationIdentifier | | | | 1 | mhp:ApplicationIdentifier |
| | | | orgID | | | 1 | unsignedInt |
| | | | appID | | | 1 | unsignedShort |
| | | applicationDescriptor | | | | 1 | mhp:ApplicationDescriptor |
| | | | type | | | 1 | mhp:ApplicationType |
| | | | | <choice> | | | |
| | | | | DvbApp | | | mhp:DvbApplicationType |
| | | | | OtherApp | | | mpeg7:mimeType |
| | | | | atsc:AtscApp | | | string |
| | | | controlCode | | | 1 | mhp:ApplicationControlCode (enumeration of string) |
| | | | visibility | | | 0...1 | mhp:VisibilityDescriptor (enumeration of string) |
| | | | serviceBound | | | 0...1 | boolean |
| | | | priority | | | 1 | ipi:Hexadecimal8bit (patterned string) |
| | | | version | | | 1 | ipi:Version (patterned string) |
| | | | mhpVersion | | | 0...1 | mhp:MhpVersion |
| | | | | profile | | 1 | ipi:Hexadecimal16bit |
| | | | | versionMajor | | 1 | ipi:Hexadecimal16bit |
| | | | | versionMinor | | 1 | ipi:Hexadecimal16bit |
| | | | | versionMicro | | 1 | ipi:Hexadecimal16bit |
| | | | icon | | | 0...1 | mhp:IconDescriptor |
| | | | storageCapabilities | | | 0...1 | mhp:StorageCapabilities |
| | | | | storageProperty | | 0...1 | mhp:StorageType |
| | | | | @launchableFromBroadcast | | R | boolean |
| | | | | @launchableCompletelyFromCache | | R | boolean |
| | | | | @launchableWithOlderVersion | | R | boolean |
| | | applicationUsageDescriptor | | | | 0...1 | mhp:ApplicationUsageDescriptor |
| | | | ApplicationUsage | | | 0...N | anyURI |

[Figure 11b]

| Element Name | | | | | | Cardinality | DataType |
|---|---|---|---|---|---|---|---|
| applicationBoundary | | | | | | 0...1 | mhp:SimpleApplicationBoundaryDescriptorType |
| | BoundaryExtension | | | | | 1...N | anyURI |
| applicationTransport | | | | | | 1...N | TransportProtocolDescriptorType |
| | <case of HTTPTransportType> | | | | | | |
| | | URLBase | | | | 1 | anyURI |
| | | URLExtension | | | | 0...N | anyURI |
| | <case of ROUTETransportType> | | | | | | |
| | | atsc:ROUTESessionInfo | | | | 1...N | |
| | | | LCTSession | | | 1...N | |
| | | | | @tsi | | 1 | string |
| | | | | @plpID | | OD | unsignedByte |
| | | | @broadcastStreamId | | | OD | unsignedShort |
| | | | @plpID | | | OD | unsignedByte |
| | | | @sourceIpAddress | | | OD | string |
| | | | @destinationIpAddress | | | OD | string |
| | | | @destinationPort | | | OD | unsignedShort |
| applicationLocation | | | | | | 1 | mhp:SimpleApplicationLocationDescriptorType (based anyURI) |
| applicationSpecificDescriptor | | | | | | 0...1 | mhp:ApplicationSpecificDescriptor |
| | <choice> | | | | | | |
| | | dvbDescriptor | | | | | mhp:DVBJDescriptor |
| | | htmlDescriptor | | | | | mhp:DVBHtmlDescriptor |
| | | otherDescriptor | | | | | mhp:OtherDescriptor |
| | atsc:atscDescriptor | | | | | | |
| | | size | | | | 0...1 | unsignedLong |
| | | requiredCapabilities | | | | 0...1 | string |
| | | icon | | | | 0...N | |
| | | | @filename | | | R | string |
| | | | @size | | | O | string |
| | | | @aspectRatio | | | O | string |

[Figure 11c]

| Element Name | | | | | Cardinality | DataType |
|---|---|---|---|---|---|---|
| ApplicationRecordingDescriptor | | | | | | |
| scheduled_recording_flag | | | | | 0..1 | boolean |
| trick_mode_aware_flag | | | | | 0..1 | boolean |
| time_shift_flag | | | | | 0..1 | boolean |
| dynamic_flag | | | | | 0..1 | boolean |
| av_synced_flag | | | | | 0..1 | boolean |
| initiating_replay_flag | | | | | 0..1 | boolean |
| storage_properties | | | | | 0..1 | unsignedByte |
| timeSlotInfo | | | | | | |
| | timeslot_type | | | | 1 | unsignedByte |
| | timeslot_start | | | | 1 | dateTime |
| | timeslot_length | | | | 1 | unsignedShort |
| | acquisition_time | | | | 1 | unsignedShort |
| | repeat_period | | | | 1 | unsignedInt |
| contentLinkage | | | | | 0..N | |
| contentItem | | | | | 0..N | |
| @location | | | | | 0..1 | anyURI |
| @contentLinkage | | | | | 0..1 | unsignedInt |
| @updatesAvailable | | | | | 0..1 | boolean |
| @size | | | | | 0..1 | unsignedLong |
| timeSlotInfo | | | | | 0..1 | |
| | timeslot_type | | | | 1 | unsignedByte |
| | timeslot_start | | | | 1 | dateTime |
| | timeslot_length | | | | 1 | unsignedShort |
| | acquisition_time | | | | 1 | unsignedShort |
| | repeat_period | | | | 1 | unsignedShort |
| graphicConstraintsDescriptor | | | | | | |
| can_run_without_visible_ui | | | | | 0..1 | boolean |
| handles_configuration_changed | | | | | 0..1 | boolean |
| handles_externally_controlled_video | | | | | 0..1 | boolean |
| graphics_configuration_byte | | | | | 0..1 | unsignedByte |
| screenPosition | | | | | 0..1 | string |
| ApplicationReference | | | | | 0..1 | mhp:ApplicationIdentifier |

【Figure 12】

| Identifier | Semantics |
|---|---|
| AUTOSTART | The application shall be started when the service is selected, unless the application is already running. |
| PRESENT | The application is allowed to run while the service is selected, however it shall not start automatically when the service becomes selected. |
| KILL | The application shall be stopped as soon as possible. |
| DISABLED | The application shall not be started and attempts to start it shall fail. |
| SUSPEND | The application shall be suspended as soon as possible. |

【Figure 13】

| ApplicationUsage values | Description |
|---|---|
| urn:dvb:mhp:2009:digitalText | Digital Text application |
| urn:atsc:3:esg | Electronic service guide |
| urn:atsc:3:eas | Emergency alert service (rich media) |
| urn:atsc:3:tai | Targeted ad insertion |

【Figure 14】

| Element Name | | | | Cardinality | DataType |
|---|---|---|---|---|---|
| ApplicationList | | | | 1 | mhp:ApplicationList |
| | Application | | | 0...N | mhp:Application |
| | | appName | | 1...N | ipi:MultilingualType(based string) |
| | | | @Language | R | dvb:ISO639-2 (patterned string) |
| | | applicationIdentifier | | 1 | mhp:ApplicationIdentifier |
| | | | orgID | 1 | unsignedInt |
| | | | appID | 1 | unsignedShort |
| | | applicationDescriptor | | 1 | mhp:ApplicationDescriptor |
| | | | type | 1 | mhp:ApplicationType |
| | | | <choice> | | |
| | | | DvbApp | | mhp:DvbApplicationType |
| | | | OtherApp | | mpeg7:mimeType |
| | | | atsc:AtscApp | | string |
| | | | controlCode | 1 | mhp:ApplicationControlCode (enumeration of string) |

【Figure 15】

| Identifier | Semantics |
|---|---|
| Active | executing |
| Suspended | temporarily suspended from execution, with its state saved |
| Released | not Active or Suspended |
| Ready | downloaded and prepared for execution, but not yet executing |

【Figure 16】
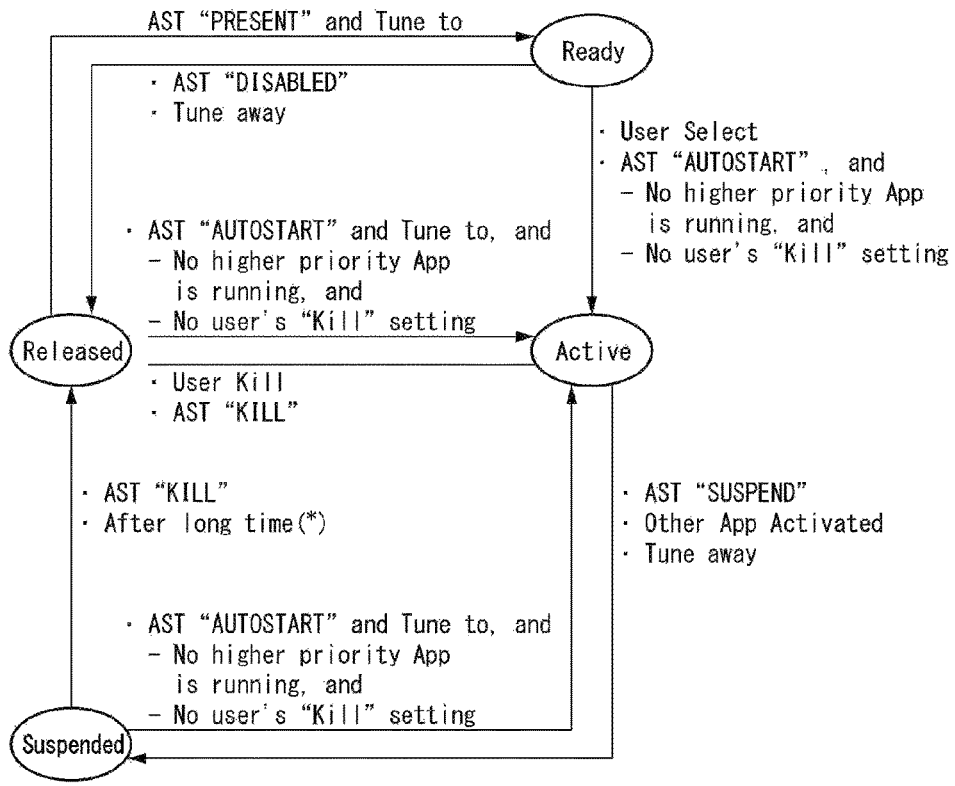
【Figure 17】
| Syntax | No. of Bits | Format |
|---|---|---|
| watermark_payload() { | | |
|     run_in_pattern | 16 | 0xEB52 |
|     for (i=0; i<N; i++) { | | |
|         wm_message_block) | var | uimsbf |
|     } | | |
|     for (i=0; i<M; i++) { | | |
|         zero_pad | 8 | 0x00 |
|     } | | |
| } | | |

【Figure 18】

| Syntax | No. of Bits | Format |
|---|---|---|
| wm_message_block() { | | |
|     wm_message_id | 8 | uimsbf |
|     wm_message_block_length | 8 | uimsbf |
|     wm_message_version | 4 | uimsbf |
|     fragment_number | 2 | uimsbf |
|     last_fragment | 2 | uimsbf |
|     wm_message_bytes() | var | |
|     if (fragment_number == last_fragment) && !fragment_number /= 0)) { | | |
|         message_CRC_32 | 32 | uimsbf |
|     } | | |
|     CRC_32 | 32 | uimsbf |
| } | | |

【Figure 19】

| wm_message_id Value | wm_message() |
|---|---|
| 0x00 | reserved |
| 0x01 | content_id_message() |
| 0x02 | presentation_time_message() |
| 0x03 | uri_message() |
| 0x04 | vp1_ message() |
| 0x05 | dynamic_event_message() |
| 0x06 | emergency_alert_message() |
| 0x07 | display_override_message() |
| 0x08-0x7F | reserved |
| 0x80-0xFF | user private |

[Figure 20]

| Syntax | No. of Bits | Format |
|---|---|---|
| dynamic_event_message() { | | |
|     delivery_protocol_type | 2 | uimsbf |
|     reserved | 6 | |
|     if (delivery_protocol_type == '1' \|\| '2'){ | | |
|         scheme_id_uri_length (N1) | 8 | uimsbf |
|         scheme_id_uri_string | 8*N1 | |
|         value_length (N2) | 8 | uimsbf |
|         value_string | 8*N2 | |
|         timescale | 32 | uimsbf |
|         presentation_time | 32 | uimsbf |
|         presentation_time_ms | 10 | |
|         duration | 32 | uimsbf |
|         id | 32 | uimsbf |
|         data_length (N3) | 8 | uimsbf |
|         data | 8*N3 | |
|     } | | |
| } | | |

[Figure 21]

| Syntax | No. of Bits | Format |
|---|---|---|
| display_override_message() { | | |
|     reserved | 4 | '1111' |
|     override_duration | 4 | uimsbf |
| } | | |

【Figure 22】

| Syntax | No. of Bits | Format |
|---|---|---|
| vp1_payload() { | | |
|     domain_type | 1 | bslbf |
|     If (domain_type == 0) { | | |
|         small_domain() | var | Table 5.15 |
|     } | | |
|     else { | | |
|         large_domain() | var | Table 5.16 |
|     } | | |
| } | | |

【Figure 23】

| Syntax | No. of Bits | Format |
|---|---|---|
| small_domain() { | | |
|     server_field | 31 | uimsbf |
|     interval_field | 17 | uimsbf |
|     query_flag | 1 | bslbf |
| } | | |

(a)

| Syntax | No. of Bits | Format |
|---|---|---|
| large_domain() { | | |
|     server_field | 23 | uimsbf |
|     interval_field | 25 | uimsbf |
|     query_flag | 1 | bslbf |
| } | | |

| Element or Attribute Name | | | | | Use | Data Type |
|---|---|---|---|---|---|---|
| RecoveryDataTable | | | | | 1 | |
| | ThisComponent | | | | 1 | |
| | | serverCode | | | 0..1 | unsignedInt |
| | | intervalCode | | | 0..1 | unsignedInt |
| | | ComponentDescription | | | 1 | |
| | querySpread | | | | 0..1 | unsignedInt |
| | OtherComponent | | | | 0..N | |
| | ContentIDList | | | | 0..1 | |
| | ContentID | | | | 1..N | |
| | | Type | | | 1 | string |
| | | cid | | | 1 | string |
| | | validFrom | | | 1 | dateTime |
| | | validUntil | | | 0..1 | dateTime |
| | SourceID | | | | 0..1 | |
| | | Choice | | | 1 | |
| | | | ATSCSourceID | | | |
| | | | | country | 1 | string |
| | | | | bsid | 1 | unsignedShort |
| | | | | majorChannelNo | 1 | 1..999 |
| | | | | minorChannelNo | 1 | 1..999 |
| | | Service | | | 1 | |
| | | | serviceId | | 1 | unsignedShort |
| | | | sltSvcSeqNum | | 1 | unsignedByte |
| | | | slsProtocol | | 0..1 | unsignedByte |
| | | | slsMajorProtocolVersion | | 0..1 | unsignedByte |
| | | | slsMinorProtocolVersion | | 0..1 | unsignedByte |
| | | | svcInetUrl | | 0..N | anyURI |
| | | | | URLtype | 0..1 | unsignedByte |

[Figure 25]
| Element or Attribute Name | | Use | Data Type |
|---|---|---|---|
| ComponentDescription | | | |
| | ComponentAnchor | 1 | |
| | mediaType | 1 | string |
| | Descriptor | 0..1 | string |
| | Priority | 0..1 | unsignedByte |
[Figure 26]
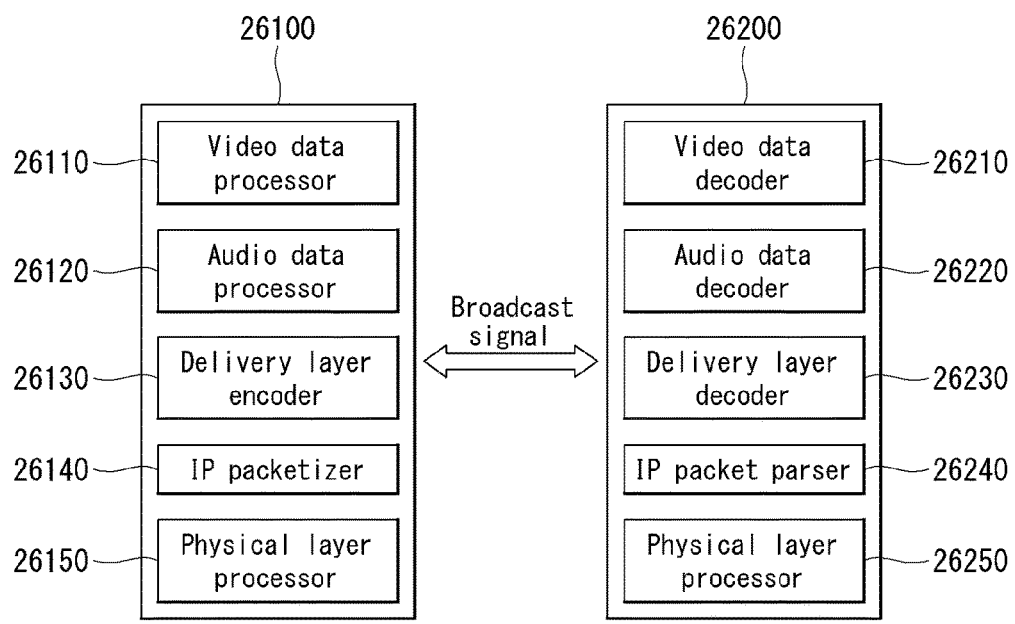

[Figure 27]
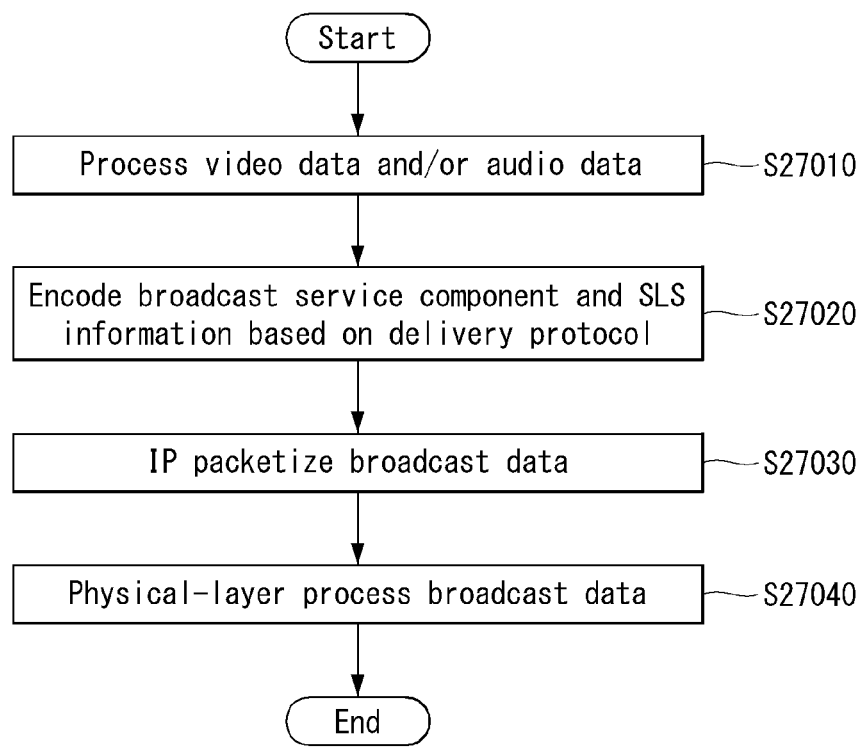

BROADCAST SIGNAL TRANSMISSION/RECEPTION DEVICE AND METHOD

This application is the National Stage Application of International Application No. PCT/KR2016/0011193, filed on Oct. 6, 2016, which claims the benefit of U.S. Provisional Application No. 62/238,684, filed on Oct. 7, 2015, U.S. Provisional Application No. 62/253,090, filed on Nov. 9, 2015 and U.S. Provisional Application No. 62/257,230, filed on Nov. 19, 2015, the contents of which are all hereby incorporated by reference herein in their entirety.

TECHNICAL FIELD

The present invention relates to a broadcast signal transmission apparatus, a broadcast signal reception apparatus and a broadcast signal reception method.

BACKGROUND ART

As the transmission of an analog broadcast signal is terminated, various techniques for transmitting/receiving a digital broadcast signal are being developed. A digital broadcast signal may include a larger amount of video/audio data than an analog broadcast signal, and may further include various types of additional data in addition to video/audio data.

DISCLOSURE

Technical Problem

A digital broadcast system may provide high definition (HD) images, multi-channel (multiple channels) audio, and various additional services. However, for digital broadcasting, data transmission efficiency for the transmission of a large amount of data, the robustness of a transmission/reception network, and network flexibility in which a mobile reception apparatus is taken into consideration must be improved.

Technical Solution

In order to solve the aforementioned technological problems, the present invention proposes a broadcast signal transmission method and a broadcast signal transmission apparatus.

A broadcast signal transmission method according to an embodiment of the present invention includes the steps of processing video data and audio data; encoding a broadcast service component including the video data and the audio data and service layer signaling (SLS) information about the broadcast service component based on a delivery protocol, wherein the SLS information provides the discovery and acquisition of the broadcast service component, and the delivery protocol includes at least one of a real-time object delivery over unidirectional transport (ROUTE) protocol and an MPEG media transport (MMT) protocol; IP-packatizing the broadcast service component, the SLS information, and service list table (SLT) information, wherein the SLT information includes bootstrap information for obtaining the SLS information; and physical-layer-processing the broadcast service component, the SLS information, and the SLT information.

In the broadcast signal transmission method according to an embodiment of the present invention, the processing of the audio data may further include the step of embedding a watermark payload in the audio data, the watermark payload may include domain type information, service field information including a server code, interval field information including an interval code, and query flag information indicative of an availability of a dynamic event, the server code may identify a server for the acquisition of supplementary content, and the interval code may identify the interval of content in which a watermark payload has been embedded.

In the broadcast signal transmission method according to an embodiment of the present invention, the watermark payload may signal a display override indicator instructing content to be presented without specific overlaid graphics or another alternate content.

In the broadcast signal transmission method according to an embodiment of the present invention, the availability of the dynamic event data may be indicated by a change of a value of the query flag information between the successive watermark payloads within a watermark segment, and a URL constructed from the watermark payload may indicate the resource of a dynamic event server when the dynamic event data is available.

In the broadcast signal transmission method according to an embodiment of the present invention, the processing of the video data may include the step of embedding a watermark payload in the video data, and the watermark payload may include at least one watermark message.

In the broadcast signal transmission method according to an embodiment of the present invention, the watermark payload may include a display override message, the display override message may instruct audio and video to be output without overlaid graphics or any obstruction, and the display override message may include override duration information indicative of duration for which a display override continues.

In the broadcast signal transmission method according to an embodiment of the present invention, the SLS information may include application signaling information to control an app-based enhancement if a broadcast service may include the app-based enhancement.

Furthermore, a broadcast signal transmission apparatus according to an embodiment of the present invention includes a video data processor processing video data, an audio data processor processing audio data, a delivery layer encoder encoding a broadcast service component including the video data and the audio data and service layer signaling (SLS) information about the broadcast service component based on a delivery protocol, wherein the SLS information provides the discovery and acquisition of the broadcast service component and the delivery protocol may include at least one of a real-time object delivery over unidirectional transport (ROUTE) protocol and an MPEG media transport (MMT) protocol, an IP packetizer IP-packatize the broadcast service component, the SLS information, and service list table (SLT) information, wherein the SLT information may include bootstrap information for obtaining the SLS information, and a physical layer processor physical-layer-processing the broadcast service component, the SLS information, and the SLT information.

In the broadcast signal transmission apparatus according to an embodiment of the present invention, the audio data processor may embed a watermark payload in the audio data, the watermark payload may include domain type information, service field information including a server code, interval field information including an interval code, and query flag information indicative of an availability of a dynamic event, the server code may identify a server for the acquisition of supplementary content, and the interval code may identify the interval of content in which a watermark payload has been embedded.

In the broadcast signal transmission apparatus according to an embodiment of the present invention, the watermark payload may signal a display override indicator instructing content to be presented without specific overlaid graphics or another alternate content.

In the broadcast signal transmission apparatus according to an embodiment of the present invention, the availability of the dynamic event data may be indicated by a change of a value of the query flag information between the successive watermark payloads within a watermark segment, and a URL constructed from the watermark payload may indicate the resource of a dynamic event server when the dynamic event data is available.

In the broadcast signal transmission apparatus according to an embodiment of the present invention, the video data processor may embed a watermark payload in the video data, and the watermark payload may include at least one watermark message.

In the broadcast signal transmission apparatus according to an embodiment of the present invention, the watermark payload may include a display override message, the display override message may instruct audio and video to be output without overlaid graphics or any obstruction, and the display override message may include override duration information indicative of duration in which a display override continues.

In the broadcast signal transmission apparatus according to an embodiment of the present invention, the SLS information may include application signaling information to control an app-based enhancement if a broadcast service may include the app-based enhancement.

Advantageous Effects

The present invention can provide various broadcast services by processing data based on a service characteristic and controlling quality of service (QoS) for each service or service component.

The present invention can achieve transmission flexibility by transmitting various broadcast services through the same radio frequency (RF) signal bandwidth.

According to the present invention, although a mobile reception apparatus is used or in the case of an indoor environment, there can be provided broadcast signal transmission and reception methods and apparatuses capable of receiving a digital broadcast signal without an error.

The present invention can effectively support a next-generation broadcast service in an environment that supports next-generation hybrid broadcasting using a terrestrial broadcast network and the Internet.

Hereinafter, additional effects of the present invention may be described along with the configuration of the invention.

DESCRIPTION OF DRAWINGS

FIG. 1 is a diagram showing a protocol stack according to an embodiment of the present invention.

FIG. 2 is a diagram showing a service discovery process according to an embodiment of the present invention.

FIG. 3 is a diagram showing a low level signaling (LLS) table and a service list table (SLT) according to an embodiment of the present invention.

FIG. 4 is a diagram showing an USBD and an S-TSID delivered to a ROUTE according to an embodiment of the present invention.

FIG. 5 is a diagram showing a USBD delivered to an MMT according to an embodiment of the present invention.

FIG. 6 is a diagram showing a link layer operation according to an embodiment of the present invention.

FIG. 7 is a diagram showing a link mapping table (LMT) according to an embodiment of the present invention.

FIG. 8 shows the structure of a broadcast signal transmission apparatus for a next-generation broadcast service according to an embodiment of the present invention.

FIG. 9 shows a writing operation of a time interleaver according to an embodiment of the present invention.

FIG. 10 is a diagram showing a block diagram of an interleaving address generator including a main-PRBS generator and a sub-PRBS generator according to each FFT mode included in a frequency interleaver according to an embodiment of the present invention.

FIG. 11 shows an application signaling table according to an embodiment of the present invention.

FIG. 12 shows an application control code according to an embodiment of the present invention.

FIG. 13 is an embodiment of an app use type according to the present invention.

FIG. 14 shows an application lifetime table (ALT) according to another embodiment of the present invention.

FIGS. 15 and 16 show the life cycle state of an application and the transition of states according to an embodiment of the present invention.

FIG. 17 shows a video watermark payload according to an embodiment of the present invention.

FIG. 18 shows a watermark message according to an embodiment of the present invention.

FIG. 19 shows the type of message according to the identifier of a watermark message according to an embodiment of the present invention.

FIG. 20 shows a dynamic event message according to an embodiment of the present invention.

FIG. 21 shows a display override message according to an embodiment of the present invention.

FIG. 22 shows an audio watermark payload according to an embodiment of the present invention.

FIG. 23 shows (a) small domain information and (b) large domain information included in the audio watermark payload.

FIG. 24 shows a recovery file format according to an embodiment of the present invention.

FIG. 25 shows component description information according to an embodiment of the present invention.

FIG. 26 shows a broadcast signal transmitter and a broadcast signal receiver according to an embodiment of the present invention.

FIG. 27 shows a broadcast signal transmission method according to an embodiment of the present invention.

BEST MODE

Preferred embodiments of the present invention are described specifically, and examples thereof are shown in the accompanying drawings. The following detailed description for which reference is made to the accompanying drawings is intended to describe preferred embodiments of the present invention rather than to describe only embodiments that may be implemented based on embodiments of the present invention. The following detailed description includes details in order to provide thorough understanding of the present invention. However, it is evident to those skilled in the art that the present invention may be executed without such details.

Most of terms used in the present invention have been selected from common terms widely used in a corresponding field, but some terms have been randomly selected by the applicant and meanings thereof are described in detail in the following description, if necessary. Accordingly, the present invention should be understood based on an intended meaning of a term not the name or meaning of the term.

The present invention provides an apparatus and method for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

In this case, the service data may be generated in an ISO base media file format (BMFF). ISO BMFF media files may be used for broadcast/broadband network delivery, media encapsulation and/or synchronization format. In this case, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. In this case, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. The LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

In this case, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

In this case, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. In this case, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. In this case, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. In this case, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear AN service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPIpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPIpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. In this case, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. In this case, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. In this case, the PLP in which the LLS is delivered may be identified by an LLS flag of L1 detail signaling information of a physical layer. The LLS flag may be a flag field indicating whether the LLS is delivered in the PLP, each PLP. In this case, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. Information on each session may be included based on the number indicated by the num_session field. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, the bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver may confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have an "HD or UHD" value. The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

The BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later. The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP.

The time interlaever according to an embodiment of the present invention may be positioned between a BICM chain block and a frame builder. In this case, the time interlaever according to an embodiment of the present invention may use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ ($e_{1,i}$ and $e_{2,i}$) corresponding to a pair of constellation mapper outputs is fed to an input of a MIMO encoder and paired MIMO encoder output (g1,i and g2,i) is transmitted by the same carrier k and OFDM symbol I of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable the reception and decoding of the PLS2 data. In addition, the PLS1 data remains constant for the duration of a frame group. The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data may include FIC_flag information. A fast information channel (FIC) is a dedicated channel for carrying cross-layer information to enable fast service acquisition and channel scanning. FIC_FLAG is a 1-bit field and indicates whether the FIC is used in a current frame. If this field is set to '1', the FIC is provided in the current frame. If this field set to '0', the FIC is not carried in the current frame. The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-ineterleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module. The frame parsing module, the demapping & decoding module, and the output processor may execute functions thereof using data output from the signaling decoding module.

The time interleaver is described below. Each TI group according to an embodiment of the present invention is either mapped directly to one frame or spread over $P_I$ frames. Each TI group is also divided into more than one TI block ($N_{TI}$), where each TI block corresponds to one usage of a time interleaver memory. The TI blocks within the TI group may contain slightly different numbers of XFEC-BLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise write a first XFECBLOCK into a first column of a TI memory, a second XFECBLOCK into a next column, and may write the remaining XFECBLOCKs within the time interleaving block. Then, in the interleaving array, cells are diagonal-wise read diagonal-wise from a first row (rightwards along a row beginning with a left-most column) to a last row, $N_r$ cells are read out. Moreover, in order to achieve single-memory deinterleaving on the receiver side regardless of a number of XFECBLOCKs in a TI block the twisted row-column block interleaver may insert the virtual XFEC-BLOCKs into the TI memory. The virtual XFECBLOCKs must be inserted in front of other FECBLOCKS to achieve single-memory deinterleaving on the receiver side.

Figure 9:
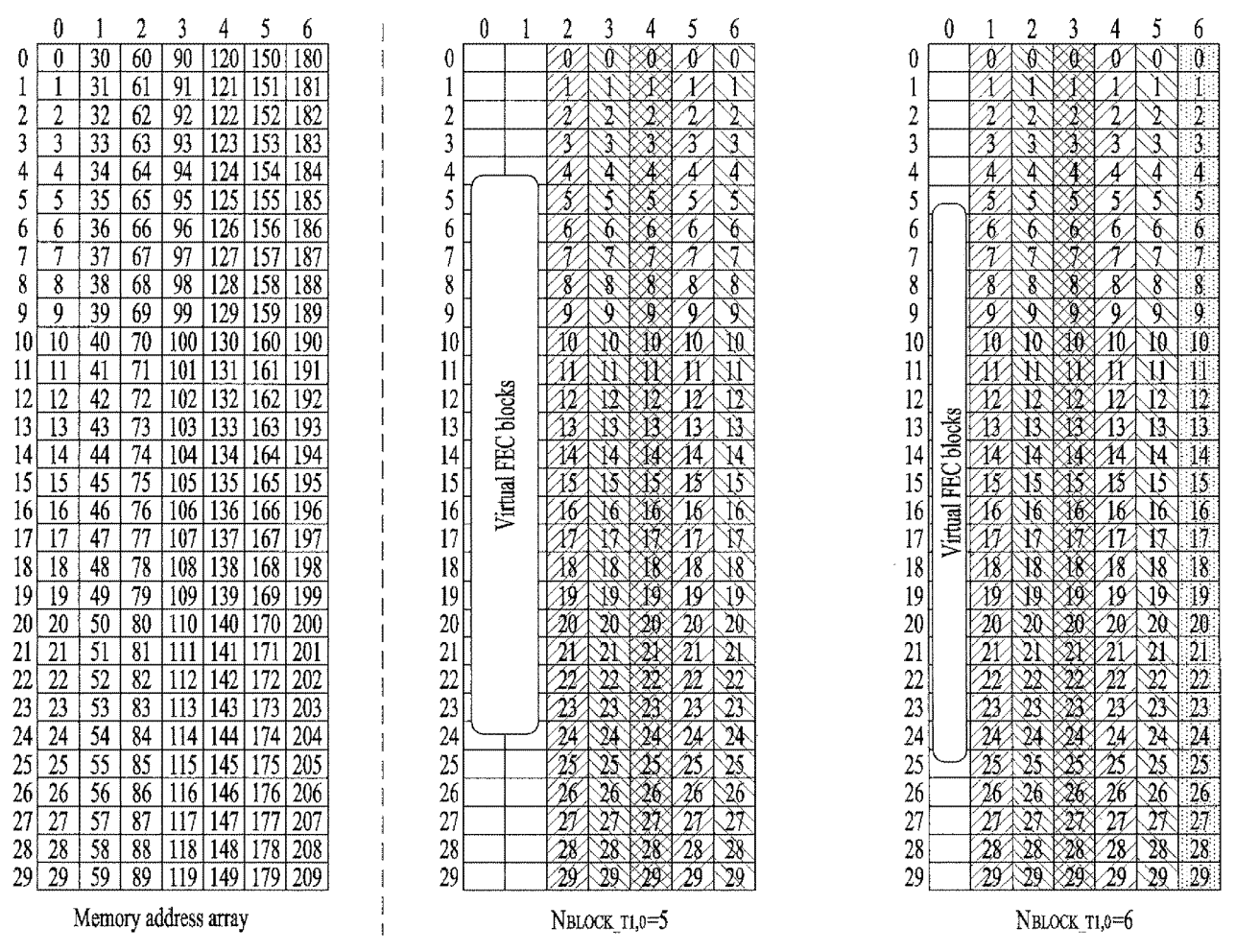

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

FIG. 10 illustrates an interleaving address generator including a main pseudo-random binary sequence (PRBS) generator and a sub-PRBS generator according to each FFT mode which are included in a frequency interleaver according to an embodiment of the present invention.

(a) shows the block diagrams of the interleaving-address generator for 8K FFT mode, (b) shows the block diagrams of the interleaving-address generator for 16K FFT mode, and (c) shows the block diagrams of the interleaving-address generator for 32K FFT mode.

The interleaving process for the OFDM symbol pair is described as follows, exploiting a single interleaving-sequence. First, available data cells (the output cells from the cell mapper) to be interleaved in one OFDM symbol $O_{m,l}$ is defined as $O_{m,l}=[x_{m,l,0}, \ldots, m_{m,l,p}, \ldots, x_{m,l,Ndata-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, V_{m,l,Ndata-1}]$ for $l=0, \ldots, N_{sym}-1$.

For the OFDM symbol pair, the interleaved OFDM symbol pair is given by $v_{m,l,Hi(p)}=x_{m,l,p}$, $p=0, \ldots, N_{data}-1$, for the first OFDM symbol of each pair $v_{m,l,p}=x_{m,l,Hi(p)}$, $p=0, \ldots, N_{data}-1$ for the second OFDM symbol of each pair, where $H_i(p)$ is the interleaving address generated based on a PRBS generator and a cyclic shift value (symbol offset) of a sub-PRBS generator.

Hereinafter, an app signaling method according to an embodiment of the present invention is described below.

An app-based service means a service including app-base features that provide a user interface for the service.

In this specification, the application may be called an app. In the present invention, an app may be a downloaded app or a native app. The downloaded app may mean a collection of downloaded documents that construct a function, such as interactivity or targeted ad insertion. The documents may include HTML, JavaScript, CSS, XML and multimedia files. The app may access data other than the part of its app. The native app may mean software built in a receiver so that it can perform a function of downloading data, such as electronic service guide (ESG) or emergency alerting (EA).

The service may include at least one app-based enhancement. For example, a linear service may include an app-based enhancement. The app-based enhancement may include an app that is driven in the background and that manages target ad insertion. Furthermore, the linear service may include an app-based enhancement including a collection of apps to provide interactive watching experiences that enhance an audio/video program. Each app-based enhancement is separately signaled. Accordingly, creators of various apps do not need to coordinate their signaling.

The collection of apps that construct the app-based enhancement may be signaled by XML document. An embodiment of the XML document is described below.

FIG. 11 shows an application signaling table according to an embodiment of the present invention.

Service signaling information may include an app signaling table (AST), such as an embodiment of FIG. 11. The AST has been divided into FIGS. 11a, 11b and 11c and shown, but may be signaled as one table.

The AST may include signaling information about each of app-based enhancements included in a service. A service or service signaling information may include at least one AST. The AST may not include all of elements shown in FIG. 11. That is, the AST includes at least element shown in the embodiment of FIG. 11. A broadcaster may control the operation of an app according to a broadcast service using an AST.

A description of each of the elements included in the AST of FIG. 11 is as follows.

ApplicationList: include a list of application elements

Application: include the properties of an application appName: the name of an application @language: the language of an appName element applicationIdentifier: identify an application orgID: a globally unique value to identify an organization responsible for an application apppID: a value to identify an application allocated by an organization specified by orgID. It may be unique in the scope of an organization specified by orgID application Descriptor: include the general properties of an app type: identify a related type of an app so that a receiver can be aware of whether the app is supported atsc:AtscApp: may be present in the AST. It may have a value indicative of ATSC 3.0 application, and the value indicative of ATSC 3.0 application may be the value of "ATSC3-HTML", for example.

controlCode: indicate the life cycle state of an application. An embodiment of control code is the same as FIG. 12.

visibility: indicates whether a consent request of the launching of an app is visible with respect to a user and/or another application that passes through an application listing API. It may be "VISIBLE_ALL."

serviceBound: indicate whether an application is bound to a service. True: broadcast-related app, false: broadcast-independent app priority: indicate related priority of an app. "FFFF" may correspond to an emergency alert (EA) app.

version: indicate the version number of an app icon: shall not be present storageCapabilities: include the properties of a storable app storageProperty: shall not be present @launchableFromBroadcast: indicate whether an app can be usefully launched before it is fully cashed @launchableCompletelyFromCache: indicates whether a connection with a transport protocol has been requested @launchableWithOlderVersion: indicates whether a longer cashed version of an app is executed although a higher version is signaled in broadcast ApplicationUsage: identify whether an app provides a specific, well-known function. An embodiment of the value of this element is shown in FIG. 13 applicationBoudary: include a set of boundaries of an app

BoundaryExtension: an URL prefix to describe data elements that construct an app. Specific URLs matched with this prefix are taken into consideration within an app boundary. The URL prefix may be a strict prefix starting from "http:", "https:", "ftp:", "tag:" or "file:." Only prefixes to construct at least one second level domain may be supported. Path elements may be overridden.

applicationTransport: may identify a transport protocol associated with a service component and provide protocol dependency information URLBase: the first part of an HHTP URL that confirms HTTP1.0 or the first part of an HTTPS ULR that confirms RFC2818 or the first part of another URL that confirms RFC 3986

URLExtension: the later part of an HHTP URL that confirms HTTP1.0 or the later part of an HTTPS ULR that confirms RFC2818 or the URL of a scheme supported by a registered interaction channel transport service provider atsc: RouteSessionInto: the parameter of an ROUTE session that carries content items related to this app, if present LCTSession: the parameter of an LST session including the part of the ROUTE session @tsi: the transport session identifier of an LCT session @plpID: the PLP identifier of an PLP including an LCT session (default: the PLP ID of the ROUTE session including an LCT session)

@broadcastStreamID: the identifier of a broadcast stream (default: a current broadcast stream)

@plpID: the PLP ID of a default PLP for an LST session within the ROUTE session. This plpID information may be overridden by the PLP ID of an individual LCT session. (default: a PLP including the AST)

@sourceIpAddress: dotted-IPv4 source address information of packets within the ROUTE session. (default: the source IP address of a packet including the AST)

@destinationIpAddress: dotted-IPv4 destination address information of a packet within the ROUTE session. (default: the destination IP address of a packet including the AST)

@destinationPort: the port number of packets within the ROUTE session (default: the destination port of packets including the AST)

applicationLocation: the URL path component of the entry point document of an app applicationSpecificDescriptor: include a specific descriptor dependent on the type of an app. It may include an externally defined descriptor.

atsc:atscDescriptor size: A total size (bytes) of an app requiredCapabilities: device capabilities meaning the rendition of an app (as defined in A/332 "service announcement"). That is, it may indicate device capabilities necessary for the smooth execution and presentation of this app.

icon: include the properties of an icon indicative of an app

@filename: indicate the file name of the icon. It may be related to the base part of a URL within applicationTransport @size: indicate the size of the icon in a pixel number. In an embodiment, values, such as "24×32", "32×32", "48×64", "64×64", "96×128", "128×128", "192×256" and "256×256", may be used.

@aspectRatio: indicate a pixel aspect ratio. In an embodiment, values, such as "1_1", "4_3" and "16_9", may be used.

ApplicationRecordingDescriptor: include extra information about an app life cycle if a program is recorded.

scheduled_recording_flag: indicates whether an application is suitable for recording if a service signaled by scheduled recording is recorded.

trick_mode_aware_flag: indicate whether an app is trick-mode aware time_shift_flag: indicates whether an app is suitable for recording if a signaled service is recorded in a time-switch recording mode.

dynamic_flag: indicates whether an app depends on the use of dynamic data from broadcast that is being executed av_synced_flag: indicates whether an app requests the use of stream events initiating_replay_flag: when it is set to 1, a terminal does not initiate the playback of a stream located in the same recording as an app. The app is responsible for the start of the playback. When it is set to 0, it starts an app as usual and initiates the playback. This flag is taken into consideration only when the playback of recording is first started. After this point, the value of this flag is overridden.

storage_properties: indicate the storage importance of a labeled part of an app. In an embodiment, they are not stored if it is "0". It indicates that storage is very critical if it is "1" and indicates that storage is optional if it is "2." "3"~"255" may be reserved for future use.

timeSlotInfo: the time interval of the type of time slot (acquisition/presentation) of an app. This element may refer to a time slot descriptor defined by Section 8.7 ("Time Slot Descriptor") of A/103 "Not-Real-Time Content Delivery."

timeslot_type: indicate the type of time slot. In an embodiment, "0" indicates an acquisition slot, "1" indicates a presentation slot, and "2"~"255" may be reserved for future use.

timeslot_start: the number of GPS seconds after UTC 00:00:00 Jan. 6, 1980 and indicates the start time of a time slot. The value of 0 indicates that the time slot has started in the indefinite past.

timeslot_length: indicate the length of a time slot in a minute unit acquitision_time: indicate a minimum time interval length necessary to guarantee that one complete instance of an app is transmitted during a time interval in a minute unit. The time interval is assumed to start at a specific time during the time slot, including the end of the time slot.

repeat_period: indicate the repetition period of a time slot in a minute unit contentLinkage: the EFDT indication number of an app contentItem: a file consumed by an app. This element refers to the syntax and concept of a content item defined in Section 6.3 "Non-Real-Time Information Table" and Section 4.2 "Content Item Concept" of A/103 "Not-Real-Time Content Delivery."

@location: the URL of a content item

@contentLinkage: the EFDT indication number of a content item

@updatesAvailable: indicates whether a content item will be periodically updated @size: a content item indicates the size in bytes timeSlotInfo: a time interval for the type of a time slot (acquisition/presentation) for a content item. This element may refer to a time slot descriptor defined by Section 8.7 ("Time Slot Descriptor") of A/103 "Not-Real-Time Content Delivery."

timeslot_type: indicate the type of a time slot. In an embodiment, "0" indicates an acquisition slot, and "1" indicates a presentation slot. "2"~"255" may be reserved for future use.

timeslot_start: the number of GPS seconds after UTC 00:00:00 Jan. 6, 1980 and indicates the start time of a time slot. The value of 0 indicates that the time slot has started in the indefinite past.

timeslot_length: indicate the length of a time slot in a minute unit.

acquitision_time: indicate a minimum time interval length necessary to guarantee that one complete instance of an app is transmitted during a time interval in a minute unit. The time interval is assumed to start at a specific time during the time slot, including the end of the time slot.

repeat_period: indicate the repetition period of a time slot in a minute unit graphicConstraintsDescriptor: a graphic restriction descriptor can_run_without_visible_ui: indicates whether an app requires UI display handles_configuration_changed: indicates whether an app can handle a change in a graphic restriction handles_externally_controlled_video: indicates whether an app can be usefully executed if the presentation of video is under the control of a second app outside a service graphics_configuration_byte: indicate a supported graphic configuration. In an embodiment, it may indicate the following information depending on a value.
- 0: reserved
- 1: full screen standard definition
- 2: full screen 960×540
- 3: full screen 1280×720
- 4: full screen 1920×1080
- 5-31: reserved for the future use of ATSC
- 32-255: reserved for future use screenPosition: indicate a screen position where an app is displayed. It may provide two positions of a top-left corner and bottom-right corner of display. An embodiment of syntax may be expressed as "x1_y1_x2_y2" if the two positions are (x1, y1) and (x2, y2). "FULL" indicates that an app is displayed on a full screen.

ApplicationReference: shall not be present

FIG. 12 shows an application control code according to an embodiment of the present invention.

A description of an identifier is as follows.

AUTOSTART: an app needs to be started when a service is selected except that the app is already executed PRESENT: the execution of an app is permitted when a service is selected, but the app does not automatically starts when the service is selected KILL: an app must be stopped as soon as possible DISABLED: an app should not start, and fails if it starts SUSPEND: an app must be suspended as soon as possible FIG. 13 is an embodiment of an app use type according to the present invention.

A description of ApplicationUsage values is as follows.
urn:dvb:mhp:2009:digitalText: digital text application
urn:atsc:3:esg: electronic service guide
urn:atsc:3:eas: emergency alert service (rich media)
urn:atsc:3:tai: target ad insertion FIG. 14 shows an application lifetime table (ALT) according to another embodiment of the present invention.

In an embodiment, information about the life cycle of an application in the AST may be separately delivered. This is for the information about the life cycle specified in a control code (controlcode) element to provide a more efficient transmission method by taking into consideration that the information is more frequently changed than other pieces of information within the AST. For example, the information about the life cycle may be provided as in FIG. 14, and a description of elements included in the information is as follows.

ApplicationList: include a list of application elements.
Application: include the properties of an application.
appNAme: the name of the application
@language: the language of an appName element
applicationIdentifier: identify the application
orgID: a globally unique value to identify an organization responsible for the application
apppID: a value to identify the application assigned by an organization specified by orgID. It may be unique in the scope of the organization specified by org ID.

applicationDescriptor: include the general properties of the app type: identify a related type of app so that a receiver can be aware of whether the app is supported. That is, it identify the type of app so that a receiver can be aware of whether the app can be normally executed.

atsc:AtsdApp: it may be present in the AST. It may have a value indicative of an ATSC 3.0 application. In an embodiment, the value indicative of ATSC 3.0 may have a value of "ATSC3-HTML."

controlCode: indicate the life cycle state of the application. An embodiment of the control code is shown in FIG. 12.

FIGS. 15 and 16 show the life cycle state of an application and the transition of states according to an embodiment of the present invention.

FIG. 15 shows app life cycle states according to identifiers. Meanings according to the identifiers are as follows.

Active: an app is being executed

Suspended: temporarily suspended from execution, and the state thereof is stored Released: not active/suspended Ready): downloaded and prepared for execution, but not yet executed FIG. 16 shows the state transition of an application.

An app may switch from the ready state to the active state in response to a user selection or "AUTOSTART" of the AST. AUTOSTART may switch to the active state when an app of higher priority is not executed or the "KILL" setting of a user is not present. An app may switch to the Released state in response to an AST "DISABLED" command or turn away.

An app may switch from the active state to the suspended state by the "SUSPEND"/other app activated/turn away of the AST. Furthermore, the app may switch from the active state to the released state by the "KILL" of a user or the "KILL" of the AST.

An app may switch from the suspended state to the active state by the "AUTOSTART" or Tune To of the AST or if an app of other higher priority is not executed or if there is no "KILL" setting of a user. The app may switch to the released state by the "KILL" command of the AST or after a specific time. Specific duration may be changed depending on a receiver implementation.

An app may switch from the released state to the active state by the "AUTOSTART" or Tune To command of the AST. AUTOSTART may switch from the released state to the active state if an app of higher priority is not executed or if there is no "KILL" setting of a user. Furthermore, the app may switch to the ready state in response to the "PRESENT" or Tune To of the AST.

The AST for the aforementioned app enhancement may be transmitted to a broadcast network. The AST may be transmitted to a service layer signaling channel. In other words, the AST may be included in SLS information and transmitted or may be referred by the SLS information and transmitted.

The AST may be delivered in a broadband. In such a case, the AST may be transmitted through an HTTP request using base URL information signaled by the SLT for a service. Such URL information may be redistributed through audio/video watermark.

Timing and location for the scheduled update of the AST may be provided by validUntil and nextURL properties within the metadata wrapper of the AST. The availability of an unscheduled update may be asynchronously signaled through a dynamic event.

A signaling method using a video/audio watermark is described below.

The video element of a broadcast program may be encoded into a data stream that may be recovered from uncompressed video in a receiver. The broadcast receiver that receives the video may use the data stream for various purposes. In an embodiment, the various purposes include the hybrid (broadband) delivery of program elements necessary to support functions, such as interactivity, dynamic ad insertion, service use monitoring, and content identification.

In this specification, a video watermarking technology is to modulate the luma component of video within the first 2 lines of each video frame. Two encoding options may be used. A 1× version method of providing a watermark payload of 30 bytes per frame and a 2× version method of providing a twice capacity may be provided. In an embodiment, a broadcast receiver may not display a corresponding video because it is aware that the first 2 lines of the video include a watermark. Luma (luminance) has information about the brightness difference of an image. In an embodiment of the present invention, a 1× emission format may use 30 bytes per video frame, and a 1× emission format may use 60 bytes per video frame. Furthermore, a VP1 message may be used as a video watermark payload. If the VP1(viewpoint 1) message is used, the VP1 message may be repeated over multiple video frames. If a watermark payload is not recovered from an individual video frame, a receiver may recover a VP1 message from two or more contiguous video frames by combining luma values. VP1 indicates a watermarking technology.

FIG. 17 shows a video watermark payload according to an embodiment of the present invention.

The payload format of a video watermark may be the same in a 1× system and a 2× system. A description of fields (information) of the watermark payload of FIG. 17 is as follows.

run_in_pattern: it is a 16-bit value and identify a video line including a watermark of a specific format wm_message_block: a fragment of wm_mwssage( ) greater than a watermark message of a full wm_message( ) or less zero_pad: a value of zero used to be padded to the end of a frame FIG. 18 shows a watermark message according to an embodiment of the present invention.

Watermark message blocks may have syntax, such as FIG. 18. A description of fields (information) included in the message of FIG. 18 is as follows.

wm_message_id: a value of 8 bits to identify data carried in a message block. An embodiment of a watermark message identified by an id is shown in FIG. 19. A video watermark message may include at least one watermark message corresponding to a watermark message ID.

wm_message_block_length: indicate the number of remaining bytes of wm_message_block that includes a CRC32 field from a field right after this field.

wm_message version: this field may be included in a watermark message block although not shown in FIG. 18. The value of this field may be increased when wm_message information is changed. A receiver may discard a duplicated message using this field. The reason for this is that a video signal may include the same watermark message repeated to guarantee reliability of delivery.

fragment_number: it is a 2-bit value and may indicate a value obtained by subtracting 1 from a current message fragment. For example, when the value of this field is "00", it indicates that a watermark message is the first fragment of the entire message. When the field value is "01", it indicates a watermark message carries the second fragment of the entire message.

last_fragment: indicate the fragment number of the last fragment that delivers a complete watermark message.

wm_message_bytes( ): when the value of the last fragment field (last_fragment) is 0, wm_message_bytes( ) may become the complete instance of a watermark message identified by watermark message ID (wm_message_id) information. When the value of the last fragment field (last_fragment) is not 0, wm_message_bytes( ) may become the fragment of a watermark message identified by watermark message ID (wm_message_id) information.

message_crc_32: if a message is transmitted in two or more fragments, 32-bit CRC that covers the message may be provided in the last fragment. If a message is not a fragmented message, a message CRC 32 field may not be present.

CRC_32: a 32-bit field including a CRC value that provides the zero output of a register within a decoder FIG. 19 shows the type of message according to the identifier of a watermark message according to an embodiment of the present invention.

As in FIG. 19, the value of a video watermark message according to each id value is as follows.

0x00: reserved

0x01: a content identifier (ID) message (content_id_message( ))

0x02: a presentation time message (presentation_time_message( ))

0x03: a URI message (uri_message( ))

0x04: a VP1 message (vp1_message( ))

0x05: a dynamic event message (dynamic_event_message( ))

0x06: an emergency alert message (emergency_alert_message( ))

0x07: a display override message (display_override_message( ))

0x08-0x7F: reserved

0x80-0xFF: user private

The content ID message delivers a content ID associated with a program and a major/minor channel number associated with a service. The content ID message is not transmitted in fragments.

The presentation time message may be carried within one watermark payload. The presentation time message indicates the presentation time of a video frame that carries a watermark. The presentation time message may include presentation time information indicative of the presentation time of a frame associated with a watermark and presentation time ms information (presentation_time_ms) indicative of an offset of a millisecond unit from the time indicated by the presentation time information.

The URI message may deliver various types of URIs. The URI message may be transmitted as fragments. The URI message may include URI type information. The URI type information may indicate a URL type, such as a signaling server, an ESG data server, a service usage data gathering report (SUDGR) server, a dynamic event HTTP server or a dynamic event web socket server, depending on its value.

The VP1 message may enable a recovery process along with a video watermark. If present, the VP1 message may be the first watermark message present in a video frame. If present, a VP1 message that carries the same data may be repeated with respect to a plurality of contiguous video frames.

The dynamic event message (dynamic_event_message) and display override message are described with reference to the following drawing.

FIG. 20 shows a dynamic event message according to an embodiment of the present invention.

The dynamic event message (dynamic_event_message) supports dynamic event delivery within a video watermark. A description of pieces of information included in the dynamic event message of FIG. 20 is as follows.

delivery_protocol_type: indicate the delivery protocol of a service to which a dynamic event may be applied. The delivery protocol may be an ROUTE/DASH protocol or an MMT protocol (MMTP).

scheme_id_uri_length: indicate the length of a scheme ID URI string (scheme_id_uri_length) field.

scheme_id_uri_string: provide scheme UD URI (schemeIdUri) information about the event stream of an event.

value_length: indicate the length of a value string (value_string) field.

value_string: indicate the value of the event stream of an event.

timescale: indicate the time scale of the event stream of an event. The time scale may be used in a duration field.

presentation_time: indicate the presentation time of an event.

presentation_time_ms: indicate an offset of a millisecond unit from the time indicated by presentation time information. An actual presentation time of a millisecond unit may be indicated using presentation time (presentation_time) information and presentation time millisecond (presentation_time_ms) information.

In order for the presentation time information to be meaningful for a ROUTE/DASH service, MPD@suggestedPresentationTime information may be present in a DASH MPD.

duration: indicate the duration of an event in the time scale.

id: indicate the ID of an event. The ID of an event may be unique within an event stream.

data_length: indicate the length of a data field.

data: include data necessary to correspond to an event. A format thereof and the use of this data may be include in an event stream specification.

FIG. 21 shows a display override message according to an embodiment of the present invention.

FIG. 21 shows an embodiment of a display override message signaled in a video watermark.

The display override message may indicate that a receiver should output a source broadcast video and source broadcast audio without specific overlaid graphic or any obstruction. When the display override message is received, a receiver may suspend a specific app that provides text and graphic on a screen, and may terminate specific replacement content, such as insertion.

overide_duration: the override duration field may indicate duration for which override must continue after a message is received. When the value of override duration information is "0", override may be immediately terminated.

An audio watermark payload is described below.

The audio watermark may be added to an audio segment by a watermark embedder. For example, the watermark embedder may receive payload data and an audio segment and output an audio segment including a watermark. In this specification, a watermark payload may be added to audio using a VP1 audio watermark technology. An output audio segment may provide a receiver with payload information through a VP1 watermark. VP1 means a standardized watermarking technology of an ATSC audio watermark emission specification. A VP1 payload may include domain type information, a server field, an interval field and a query flag.

A VP1 audio watermark is co-resident with audio energy within the region of an audio frequency spectrum including a perceptually important component. In a receiver, a watermark extractor may extract payload data from received audio.

An audio watermark payload may be transmitted in a packet structure. The packet of an audio watermark may include scrambled parity (scrambled_parity) information and scrambled payload (scrambled_payload) information. The scrambled payload information may be scrambled VP1 payload (scrambled_vp1_payload) information. A VP1 payload may be called a watermark payload.

FIG. 22 shows an audio watermark payload according to an embodiment of the present invention.

An audio watermark payload, that is, a VP1 payload, may include domain type information, small domain information (small_domain) and large domain (large_domain) information. The domain type information indicates whether payload information is for a small domain or for a large domain. The small domain means the division of a payload having an interval field of a 17-bit size, which is sufficient to support watermarking of content of about 54 hours. The large domain means the division of a payload having an interval field of a 25-bit size, which is sufficient to support watermarking of content of about 1 year and 7 months.

FIG. 23 shows (a) small domain information and (b) large domain information included in an audio watermark payload.

As in FIG. 23, each of small domain information and large domain information may include server field (server_field) information, interval field (interval_field) information, and query flag (query_flag) information.

The server field (server_field) information may include a server code.

The interval field (interval_field) information may include an interval code.

The query flag (query flag) field may be signaled when a dynamic event is available. A change of this field value between the contiguous watermark payloads within a watermark segment indicates that a dynamic event is available from a dynamic event HTTP server.

In the case of a small domain, the range of the value of a server code may be 00000000~7FFFFFFF (hexadecimal), and the range of an interval code value may be 00000000~0001FFFF (hexadecimal). In the case of a large domain, the range of the value of a server code may be 00000000~007FFFFF (hexadecimal), and the range of an interval code value may be 00000000~01FFFFFF (hexadecimal).

In an embodiment, an interval code of all of "1s" may be used as a signal that instructs a receiver to immediately stop all of graphic overlays and/or substitute content. The interval code is not used to transmit a request to a remote server. The interval code having the "1s" may be used as the aforementioned display override information. In this case, the interval code having 1s may be called a display override indicator. In other words, an audio watermark payload may include or carry a display override indicator.

In the case of a small domain watermark type, the interval code of a display override indicator may include 17 contiguous 1s. In the case of a large domain watermark type, the interval code of a display override indicator may include 25 contiguous 1s.

The interval code values may be used to instruct a receiver to immediately stop graphic overlay or substitute content and to exclusively display unaltered content from a broadcast stream. The interval code values do not have a meaning as a media timeline time base.

The use of the interval code may be orthogonal to the value of the server code. The server code may be set to indicate that a broadcast stream is displayed as unusual.

An audio watermark segment is the contiguously marked interval of content, including a VP1 payload within contiguous cells having the same server code and a sequentially incrementing interval code. A query flag may be changed between contiguous VP1 payloads within the audio watermark segment. The audio watermark segment may include VP1 payloads within contiguous cells having the same server code and a sequentially incrementing interval code.

The recovery process of a receiver is described below. Redistribution setting means a situation in which audio/video TV content without direct access to a broadcast stream. The recovery process means a process for a receiver to obtain supplementary content provided by the broadcaster of content that is being received in broadband by accessing the supplementary content.

When a receiver receives an audio watermark included in the content or receives a VP1 message included in a video watermark, it may perform a recovery process. When a full set of video watermarks is received in receiving content, a device may perform another recovery process.

Watermark-based signaling acquisition processing through a broadband started from a VP1 message included in an audio watermark or video watermark may be performed as follows.

The receiver may recover a VP1 payload from the audio or video watermark. Furthermore, a receiver may form a URL for a request using the domain type, server field and interval field of the VP1 payload, and may transmit an HTTP request to a recovery file server using the URL.

The receiver may receive a recovery file as a response to the request. The recovery file may include the original presentation time of content information about a service that is being watched, and a URL used to retrieve a set of signaling files necessary for the access and presenting of supplementary content at the start of the VP1 payload.

The receiver may recover the following set of signaling files using the URLs of a recovery file.
 an MPD for a ROUTE/DASH service and MMPT services and ROUTE/DASG services having available additional streaming content through the Internet
 an AST for services including an available app-based feature through the Internet
 an AEI for MMT services
 an MPT for MMT services A receiver may obtain and provide supplementary content using a signaling file. The receiver may synchronize the supplementary content and audio/video using timing information of a recovery file.

The query flag of a VP1 payload may be used to signal the availability of an event. When the query flag is detected, a receiver may request an event.

A recovery file, a dynamic event and signaling files may be delivered as a multi-part multipurpose Internet mail extensions (MIME) message encapsulated as a multimedia broadcast/multicast service (MBMS) metadata envelope. The multi-part MIME message encapsulated as the MBMS metadata envelope includes a valid from attribute, a valid until attribute, and a next URL ("next URL") attribute. The valid from attribute and the valid until attribute define the valid interval of a signaling file, and the next URL attribute defines the URL of a next scheduled version of a signaling file. Accordingly, a device may perform the scheduled update of a required signaling file.

This event may be used to signal the execution of an app or the availability of the scheduled update of a signaling file in a runtime environment. In the former case, a receiver may transfer an event to a registered app so that the event is executed. In the latter case, an event includes the URL of an updated signaling file, and a receiver may retrieve the signaling file.

If an audio watermark disappears, a receiver may terminate the presentation of specific supplementary content. In this case, a receiver may recognize the disappearance of the watermark as "turn away" to a new service that does not support specific supplementary content.

If the server field of an audio watermark is changed or an interval field has discontinuity, a receiver may terminate the presentation of specific supplementary content and restart signaling acquisition.

In the case of a ROUTE/DASH-based service, the original presentation time within the recovery file of content at the start of a watermark may be associated with the media presentation time of the current MPD of a service. In the case of an MMT-based service, the original presentation time within the recovery file of content at the start of a watermark may be an NPT time.

A signaling acquisition method based on the aforementioned audio watermark may be applied to a signaling acquisition method based on a video watermark within a common range.

FIG. 24 shows a recovery file format according to an embodiment of the present invention.

A receiver may transmit a recovery data request to a recovery server. The receiver may transmit the recovery data request by issuing an HTTP GET or HTTP GET request with respect to a resource specified by a URL configured from a VP1 payload. In the HTTP request, a host name may be determined based on the domain type of a VP1 watermark code.

A recovery file format may be a JSON document. A unique recovery file may be present in each VP1 payload. A description of elements/attributes in the recovery file of FIG. 24 is as follows.

ThisComponent: a media component in which a watermark including a VP1 payload having a server code and an interval code has been embedded
 serverCode: provide a server code value used in a query request (HTTP request) in which a recovery data table is provided as a response
 intervalCode: provide an interval code value used in a query request (HTTP request) in which a recovery data table is provided as a response
 ComponentDescription: a data element that describes ThisCompoment provided in FIG. 25
 querySpread: indicate maximum duration that delays the submission of a dynamic event HTTP request. If this field is signaled by a query flag in a VP1 payload, time of a millisecond unit that randomly selects time to query a dynamic event server.
 OtherComponent: describe a watermark media component associated with the same service as ThisCompoment. It indicates audio or video components different from this component that carries a coincident VP1 payload.
 ContentIDList: a content ID list
 ContentID: a content identifier.

type: —the type of ContentId, and this value may indicate "EIDR" or "Ad-ID."

"EIDR" indicate a content identification per EIDR registry

"Ad-ID" indicates a content identifier per Ad-ID registry cid: may include an EIDR or Ad-ID string. The type of content identifier may be given by the type attribute of ContentID.

validFrom: provide information about when a content ID is valid.

validUntil: provide information about how long will a content ID is valid

SourceID: indicate a distribution source that may be provided by watermark content ATSCSourceID: indicate a distribution source that adopts an ATSC emission specification.

country: a country code associated with a primary administrative entity to which a broadcast stream ID (BSID) has been assigned bsid: the BSID of an ATSC distribution source.

majorChannelNo: the major channel number of a service minorChannelNo: the minor channel number of a service Service: indicate a service that signals a format and broadband location serviceId: an identifier (16-bit integer) uniquely identifying this service within a broadcast area sltSvcSeqNum: indicate the sequence number of SLT service information having the same service ID as service ID properties. The value of SLT service sequence number (sltSvcSeqNum) information for each service may be increased by 1 if there is a change of a service element. If a change is not present, the value of sltSvcSeqNum is not increased. When the value of sltSvcSeqNum reaches a maximum value, the sequence number may return to 0.

slsProtocol: a protocol used to deliver service layer signaling information of this service, and may be a ROUTE/DASH or an MMTP.

slsMajorProtcolVersion: the major version number of a signaling protocol indicated in SLS protocol (slsProtocol) information—Major version number for the signaling protocol specified in slsProtocol.

slsMinorProtocolVersion: the minor version number of a signaling protocol indicated in SLS protocol (slsProtocol) information svcInetUrl: indicate a base URL that may connect an ESG or service level signaling file for this service to a broadband URLtype: an available file type of service Inet URL (svcInetUrl) information and may indicate the URL of a signaling server or the URL of an ESG data server.

FIG. 25 shows component description information according to an embodiment of the present invention.

The component description information describes a watermarked media component associated with a service.

ComponentAnchor: component anchor information provides information about the first VP1 payload within a watermarked media component.

mediaType: media type information indicates the media type of this component. "audio" indicates that this component description information is applied to an audio component, "video" indicates that this component description information is applied to a video component, and "both" indicates that this component description information is applied to both an audio component and a video component depending on the value of a string.

Descriptor: description information includes information associated with a component consumed by an app.

Priority: indicate relative priority of a component that carries a server code and an interval code. A recovery file indicated by a component having a higher priority value may take precedence over a recovery file indicated by a component having a lower priority value. If this component does not have a priority value, it may be set to 0.

Furthermore, dynamic event retrieval via a broadband may be performed using an audio watermark.

The availability of dynamic event data may be indicated by a change of a query flag (query_flag) field value between contiguous VP1 payloads within a watermark segment. A receiver may transmit a dynamic event request to a recovery server by issuing an HTTP GET or HTTP GET request. The HTTP GET or HTTP GET request may be issued with respect to a resource specified by a URL constructed from a VP1 payload in which the value of a query flag is different from the query flag value of a preceding payload. For example, a URL template may be configured like "http[s]://{hostName}/a336/dyn/{subdName}/{serverCode}-{intervalCode}.dyn."

The DNS resolution of {hostName} to the unspecified IP address (0.0.0.0/32 in the case of an IPv4 address or ::/128 in the case of an IPv6 address) shall indicate that a recovery protocol is not supported for a code domain. Recovery file requests should not be issued to the unspecified address.

A response to a recovery data request may include a dynamic event. If the dynamic event indicates that at least one signaling update is available, a response to the recovery data request may include at least one signaling file along with a dynamic event. The at least one signaling file may be delivered as a multi-part MIME message encapsulated as an MBMS metadata envelope.

A method of obtaining signaling information using a video watermark is described below.

A receiver may obtain a video watermark having a channel ID payload and a signaling URL payload. The receiver may obtain the signaling files of a multi-part MIME message form using a signaling URL to a signaling URL payload. The form of the multi-part MIME message may be used in the signaling URL of an audio watermark recovery file.

A receiver may access or present supplementary content using signaling files. The receiver may synchronize audio/video from a cable and supplementary content using timing information of a channel ID payload.

Each signaling file includes a valid from attribute, a valid until attribute, and a next URL ("next URL") attribute. The valid from attribute and the valid until attribute define the valid interval of a signaling file. The next URL attribute defines the URL of a next scheduled version of a signaling file. Accordingly, a receiver may perform the scheduled update of a required signaling file Dynamic events may appear as the dynamic event payload of a video watermark. The dynamic event may be used to control an application being executed in a runtime environment. Alternatively, the dynamic event may be used to signal the availability of an unscheduled update of a signaling file. If the dynamic event is used for app control, a receiver may provide an available event in a specific app. If the dynamic event is used for signaling file update, the dynamic event includes the URL of an updated signaling file(s). The receiver may obtain an updated signaling file(s) from the URL. The signaling file(s) may have the same format as files obtained from a signaling URL, and may include a valid from attribute, a valid until attribute, and a next URL ("next URL") attribute.

If a video watermark disappears with respect to a specific time interval, a receiver may terminate the presentation of specific supplementary content. In this case, a receiver may recognize the disappearance of the watermark as "turn away" to a new service that does not support the specific supplementary content. For example, the specific time interval may be 1.5 second.

If a channel ID watermark appears with respect to a specific time interval (1.5 second), if a channel ID watermark appears along with a new combination of a BSID and a channel number, or if discontinuity is present in the media time, a receiver may terminate the presentation of specific supplementary content and restart signaling acquisition.

FIG. 26 shows a broadcast signal transmitter and a broadcast signal receiver according to an embodiment of the present invention.

The broadcast signal transmitter 26100 may include a video data processor 26110, an audio data processor 26120, a delivery layer encoder 26130, an IP packetizer 26140, and a physical layer processor 26150.

The video data processor 26110 may process video data based on the video format of a broadcast system or broadcast service. The video data processor 26110 may embed a watermark payload in the video data. The video data processor 26110 may add the watermark payload to a video segment.

The audio data processor 26120 may process audio data based on the audio format of a broadcast system or broadcast service. The audio data processor 26120 may embed a watermark payload in the audio data. The audio data processor 26120 may add the watermark payload to an audio segment.

The delivery layer encoder 26130 may encode a broadcast service component and SLS information about the broadcast service component based on a delivery protocol. The IP packetizer may perform an IP package on the broadcast service component, the SLS information, and SLT information. The operations of the delivery layer encoder 26130 and the IP packetizer 26140 have been described above with reference to FIGS. 1 to 5.

The physical layer processor 26140 may physical-layer-process broadcast data including a broadcast service component, SLS information and SLT information. The physical layer processor and an operation thereof have been described above with reference to FIGS. 8 to 10.

The broadcast signal receiver 26200 includes a video data decoder 26210, an audio data decoder 26220, a delivery layer decoder 26230, an IP packet parser 26240, and a physical layer processor 26250. The broadcast signal receiver 26200 may perform an operation corresponding to the inverse process of the broadcast signal transmitter 26100.

The physical layer processor 26250 may output a data stream by physical-layer-processing a received broadcast signal. The data stream may include IP packets. The physical layer processor 26250 may perform the inverse operation of the transmission operation described with reference to FIGS. 8 to 10.

The IP packet parser 26250 may parse an IP packet. The IP packet parser 26250 may parse the data of a specific IP necessary to provide a service.

The delivery layer decoder 26230 may decode at least one of a broadcast service component and SLS information based on a delivery protocol.

The IP packet parser 26250 and the delivery layer decoder 26230 may perform the inverse operations of the transmission operations described with reference to FIGS. 1 to 5.

The audio data decoder 26220 may decode audio data. The audio data decoder 26220 may extract a watermark payload included in the audio data by decoding the audio data.

The video data decoder 26210 may decode video data. The video data decoder 26210 may extract a watermark payload included in the video data by decoding the video data.

FIG. 27 shows a broadcast signal transmission method according to an embodiment of the present invention.

The broadcast signal transmitter may process video data and/or audio data (S27010). The broadcast signal transmitter may process at least one of the video data and the audio data and add a watermark payload to the processed data.

The broadcast signal transmitter may encode a broadcast service component and SLS information based on a delivery protocol (S27020). The broadcast service component may include at least one of the video data and the audio data. The SLS information may provide the discovery and acquisition of the broadcast service component. The delivery protocol may include at least one of the ROUTE protocol and the MMT protocol.

The broadcast signal transmitter may IP-packetize broadcast data (S27030). The broadcast data may include the broadcast service component, the SLS information, and SLT information. The SLT information may include bootstrap information for obtaining the SLS information.

The encoding and IP packetizing based on the delivery protocol of the broadcast signal transmitter have been described above with reference to FIGS. 1 to 5.

The broadcast signal transmitter may physical-layer-process the broadcast data (S27040). The physical layer processing and broadcast signal transmission of the broadcast data have been described above with reference to FIGS. 8 to 10.

The step of processing the audio data may further include the step of embedding a watermark payload in the audio data. The watermark payload may include domain type information, service field information including a server code, interval field information including an interval code, and query flag information indicative of the availability of a dynamic event. The server code may identify a server for the acquisition of supplementary content, and the interval code may identify the interval of content in which the watermark payload has been embedded.

The audio watermark payload may signal a display override indicator indicating that content should be presented without specific overlaid graphics or another alternate content.

In the audio watermark payload, the availability of the dynamic event may be indicated by a change of the value of query flag information between the contiguous watermark payloads within a watermark segment. When the dynamic event is available, the URL constructed from the watermark payload may indicate the resource of a dynamic event server.

The step of processing the video data may further include the step of embedding a watermark payload in the video data. The video watermark payload may include at least one watermark message.

The video watermark payload may include a display override message. The display override message may indicate that audio and/or video should be output without overlaid graphics or another obstruction. The display override message may include override duration information indicative of duration for which a display override continues.

The SLS information may include application signaling information that controls an app-based enhancement if a broadcast service includes the app-based enhancement. Such application signaling information may include at least one piece of information included in the AST of FIG. 11.

The present invention provides an additional information signaling method using an audio watermark or a video watermark. In a broadcast system, to change all of pieces of information, such as SLT, SLS, and an ESG, for a temporary or unscheduled event may be inefficient or impossible. Accordingly, in this situation, necessary information may be signaled using the watermark data of audio data or video data.

In particular, in the present invention, at least one of a video watermark and an audio watermark may include a display override indicator/message. Since the display override indicator is included in the watermark, a receiver may first provide a corresponding video/audio when decoding the video/audio. Accordingly, in particular, if content having very high priority, such as an emergency alert message, is transmitted urgently/immediately, a content delivery probability can be improved using a watermark. Furthermore, there is an advantage in that signaling can be immediately performed because signaling information of a complicated layer is not used.

Furthermore, at least one of a video watermark and a video watermark may provide signaling information for providing a dynamic event. In order to provide an unscheduled service or a suddenly changing service, a change of the corresponding service must be signaled. Such signaling information may be provided separately from an already transmitted SLT and SLS. In particular, if a change of a service is temporary, to change both an SLT and/or SLS may be inefficient. Accordingly, in the present invention, dynamic event data may be transmitted using a watermark. The watermark may provide a URL indicative of the availability of a dynamic event and the resource of a dynamic event server. Accordingly, when a dynamic event is generated, a receiver may receive signaling information about the dynamic event from a corresponding server, and may provide a corresponding service or information about the service.

In the present invention, the broadcast transmitter may control an app-based enhancement by transmitting the AST. An embodiment of signaling information for controlling the app-based enhancement has been shown in FIG. 11. A service provider can efficiently control the supplementary function of the broadcast receiver using the AST, such as FIG. 11.

Each of the steps described in the aforementioned embodiment may be performed by hardware/processors. Each of the modules/blocks/units described in the aforementioned embodiment may operate as hardware/processor. Furthermore, the methods proposed by the present invention may be executed in the form of code. The code may be written in a processor-readable storage medium and thus may be read by a processor provided by an apparatus.

Although the drawings have been divided and described for convenience of description, the embodiments described with reference to the drawings may be merged to implement a new embodiment. The apparatus and method according to the present invention are not limited and applied to the apparatuses and methods according to the embodiments described above, and some or all of the aforementioned embodiments may be selectively combined and configured so that the embodiments are modified in various manner.

Meanwhile, the method proposed by the present invention may be implemented in a processor-readable recording medium included in a network apparatus, in the form of processor-readable code. The processor-readable recording medium includes all types of recording devices in which data readable by a processor is stored. The processor-readable recording medium may include ROM, RAM, CD-ROM, magnetic tapes, floppy disks, and optical data storage devices, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although some embodiments of the present invention have been illustrated and described above, the present invention is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of the present invention.

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the apparatus and method inventions have been described, and the descriptions of both the apparatus and method inventions may be complementarily applied.

MODE FOR INVENTION

Various embodiments have been described in the best form for implementing the present invention.

INDUSTRIAL APPLICABILITY

The present invention is used in a series of broadcast signal transmission/reception fields.

It is evident to those skilled in the art will understand that the present invention may be changed and modified in various ways without departing from the spirit or range of the present invention. Accordingly, the present invention is intended to include all the changes and modifications provided by the appended claims and equivalents thereof.

The invention claimed is:

1. A broadcast signal transmission method, comprising steps of:

generating a video component and an audio component;

processing a broadcast service component comprising the video component and the audio component and service layer signaling (SLS) information about the broadcast service component based on a delivery protocol, wherein the SLS information provides a discovery and acquisition of the broadcast service component, and the delivery protocol comprises at least one of a real-time object delivery over unidirectional transport (ROUTE) protocol and an MPEG media transport (MMT) protocol;

IP packetizing the broadcast service component, the SLS information, and service list table (SLT) information, wherein the SLT information comprises bootstrap information for obtaining the SLS information; and transmitting the broadcast service component, the SLS information, and the SLT information.

2. The broadcast signal transmission method of claim 1, wherein:

the generating of the audio component further comprises embedding a watermark payload in audio data of the audio component, and the watermark payload comprises domain type information, service field information comprising a server code, interval field information comprising an interval code, and query flag information indicative of an availability of a dynamic event.

3. The broadcast signal transmission method of claim 2, wherein the watermark payload signals a display override indicator instructing content to be presented without specific overlaid graphics or another alternate content.

4. The broadcast signal transmission method of claim 2, wherein:

the availability of the dynamic event data is indicated by a change of a value of the query flag information between the successive watermark payloads within a watermark segment.

5. The broadcast signal transmission method of claim 1, wherein:

the generating of the video component comprises embedding a watermark payload in video data of the video component, and the watermark payload comprises at least one watermark message.

6. The broadcast signal transmission method of claim 5, wherein:

the watermark payload comprises a display override message, the display override message instructs audio and video to be output without overlaid graphics or any obstruction, and the display override message comprises override duration information indicative of duration for which a display override continues.

7. A broadcast signal transmission apparatus, comprising:

a video data processor configured to generate a video component, an audio data processor configured to generate an audio component, a delivery layer processor configured to processor a broadcast service component comprising the video component and the audio component and service layer signaling (SLS) information about the broadcast service component based on a delivery protocol, wherein the SLS information provides a discovery and acquisition of the broadcast service component and the delivery protocol comprises at least one of a real-time object delivery over unidirectional transport (ROUTE) protocol and an MPEG media transport (MMT) protocol, an IP packetizer configured to IP packetize the broadcast service component, the SLS information, and service list table (SLT) information, wherein the SLT information comprises bootstrap information for obtaining the SLS information, and a physical layer processor configured to transmit the broadcast service component, the SLS information, and the SLT information.

8. The broadcast signal transmission apparatus of claim 7, wherein:

the audio data processor embeds a watermark payload in audio data of the audio component, and the watermark payload comprises domain type information, service field information comprising a server code, interval field information comprising an interval code, and query flag information indicative of an availability of a dynamic event.

9. The broadcast signal transmission apparatus of claim 8, wherein the watermark payload signals a display override indicator instructing content to be presented without specific overlaid graphics or another alternate content.

10. The broadcast signal transmission apparatus of claim 8, wherein:

the availability of the dynamic event data is indicated by a change of a value of the query flag information between the successive watermark payloads within a watermark segment.

11. The broadcast signal transmission apparatus of claim 7, wherein:

the video data processor embeds a watermark payload in video data of the video component, and the watermark payload comprises at least one watermark message.

12. The broadcast signal transmission apparatus of claim 11, wherein:

the watermark payload comprises a display override message, the display override message instructs audio and video to be output without overlaid graphics or any obstruction, and the display override message comprises override duration information indicative of duration for which a display override continues.

13. A broadcast signal receiving method, comprising steps of:

receiving a broadcast signal comprising IP packets;

parsing the IP packets comprising service list table (SLT) information, service layer signaling (SLS) information and a broadcast service component, the broadcast service component comprising a video component and an audio component;

processing at least one of the service layer signaling (SLS) information and the broadcast service component based on a delivery protocol, the delivery protocol comprises at least one of a real-time object delivery over unidirectional transport (ROUTE) protocol and an MPEG media transport (MMT) protocol;

decoding the video component and the audio component;

wherein the SLT information comprises bootstrap information for obtaining the SLS information and wherein the SLS information provides a discovery and acquisition of the broadcast service component.

14. The broadcast signal receiving method of claim 13, wherein:

the decoding of the audio component further comprises extracting a watermark payload from audio data of the audio component, and the watermark payload comprises domain type information, service field information comprising a server code, interval field information comprising an interval code, and query flag information indicative of an availability of a dynamic event.

15. The broadcast signal receiving method of claim 14, wherein the watermark payload signals a display override indicator instructing content to be presented without specific overlaid graphics or another alternate content.

16. The broadcast signal receiving method of claim 14, wherein:

the availability of the dynamic event data is indicated by a change of a value of the query flag information between the successive watermark payloads within a watermark segment.

17. The broadcast signal receiving method of claim 13, wherein:
the decoding of the video component comprises extracting a watermark payload from video data of the video component, and
the watermark payload comprises at least one watermark message.

18. The broadcast signal receiving method of claim 13, wherein:
the watermark payload comprises a display override message,
the display override message instructs audio and video to be output without overlaid graphics or any obstruction, and
the display override message comprises override duration information indicative of duration for which a display override continues.

19. A broadcast signal receiving apparatus, comprising:
a receiver configured to receive a broadcast signal comprising IP packets;
an IP de-packetizer configured to parse the IP packets comprising service list table (SLT) information, service layer signaling (SLS) information and a broadcast service component, the broadcast service component comprising a video component and an audio component;
a delivery layer processor configured to process at least one of the service layer signaling (SLS) information and the broadcast service component based on a delivery protocol, the delivery protocol comprises at least one of a real-time object delivery over unidirectional transport (ROUTE) protocol and an MPEG media transport (MMT) protocol;
a video decoder configured to decode the video component;
an audio decoder configured to decode the audio component;
wherein the SLT information comprises bootstrap information for obtaining the SLS information and wherein the SLS information provides a discovery and acquisition of the broadcast service component.

20. The broadcast signal receiving apparatus of claim 19, wherein:
the audio decoder extracts a watermark payload from audio data of the audio component, and the watermark payload comprises domain type information, service field information comprising a server code, interval field information comprising an interval code, and query flag information indicative of an availability of a dynamic event.

21. The broadcast signal receiving apparatus of claim 20, wherein the watermark payload signals a display override indicator instructing content to be presented without specific overlaid graphics or another alternate content.

22. The broadcast signal receiving apparatus of claim 20, wherein:
the availability of the dynamic event data is indicated by a change of a value of the query flag information between the successive watermark payloads within a watermark segment.

23. The broadcast signal receiving apparatus of claim 19, wherein:
the video decoder extracts a watermark payload from video data of the video component, and
the watermark payload comprises at least one watermark message.

24. The broadcast signal receiving apparatus of claim 23, wherein:
the watermark payload comprises a display override message,
the display override message instructs audio and video to be output without overlaid graphics or any obstruction, and
the display override message comprises override duration information indicative of duration for which a display override continues.

* * * * *